(12) United States Patent
MacIlwaine et al.

(10) Patent No.: US 10,902,420 B2
(45) Date of Patent: *Jan. 26, 2021

(54) MERCHANT CONFIGURED ADVERTISED INCENTIVES FUNDED THROUGH STATEMENT CREDITS

(71) Applicant: Visa International Service Association, San Francisco, CA (US)

(72) Inventors: John Hamilton MacIlwaine, Danville, CA (US); Patrick Stan, Pacifica, CA (US); Surendra Keshan, Cupertino, CA (US); Mark Carlson, Half Moon Bay, CA (US)

(73) Assignee: Visa International Service Association, San Francisco, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/142,262

(22) Filed: Sep. 26, 2018

(65) Prior Publication Data

US 2019/0026734 A1    Jan. 24, 2019

Related U.S. Application Data

(63) Continuation of application No. 15/599,296, filed on May 18, 2017, now Pat. No. 10,354,250, which is a
(Continued)

(51) Int. Cl.
*G06Q 30/00* (2012.01)
*G06Q 20/38* (2012.01)
*G06Q 30/02* (2012.01)

(52) U.S. Cl.
CPC .......... *G06Q 20/387* (2013.01); *G06Q 30/02* (2013.01); *G06Q 30/0215* (2013.01)

(58) Field of Classification Search
CPC ... G06Q 30/02; G06Q 30/0215; G06Q 20/387
(Continued)

(56) References Cited

U.S. PATENT DOCUMENTS

| 4,613,904 A | 9/1986 | Lurie |
| 5,401,946 A | 3/1995 | Weinblatt |

(Continued)

FOREIGN PATENT DOCUMENTS

| JP | 2000357204 A | 12/2000 |
| JP | 2009501891 A | 1/2009 |

(Continued)

OTHER PUBLICATIONS

Anil Bawa-Cavia, "Sensing the Urban—Using location-based social network data in urban analysis", Working Paper, Sep. 20, 2010.
(Continued)

*Primary Examiner* — Sun M Li
(74) *Attorney, Agent, or Firm* — The Webb Law Firm

(57) ABSTRACT

An advertised incentive system receives advertised incentive configuration information provided by a merchant. The advertised incentive configuration information defines the content of advertised incentive banners. The advertised incentive banners are provided as needed to merchants to display on the merchant's website. Advertised incentive registration information is received from an account holder after the account holder interacts with the advertised incentive banner. Transaction information is received that contains a qualified purchase made by the account holder. The advertised incentive registration and the qualified purchase are matched. A statement credit is issued against the account holder's account and a debit is issued against the merchant's account in the amount of the statement credit.

9 Claims, 6 Drawing Sheets

Related U.S. Application Data continuation of application No. 13/053,113, filed on Mar. 21, 2011, now Pat. No. 9,697,520.

(60) Provisional application No. 61/316,336, filed on Mar. 22, 2010.

(58) Field of Classification Search
USPC .................. 705/14.4, 14.49, 14.73, 14.17
See application file for complete search history.

(56) References Cited

U.S. PATENT DOCUMENTS

| | | |
|---|---|---|
| 5,592,560 A | 1/1997 | Deaton et al. |
| 5,604,921 A | 2/1997 | Alanara |
| 5,621,812 A | 4/1997 | Deaton et al. |
| 5,684,990 A | 11/1997 | Boothby |
| 5,687,322 A | 11/1997 | Deaton et al. |
| 5,710,886 A | 1/1998 | Christensen et al. |
| 5,745,036 A | 4/1998 | Clare |
| 5,806,045 A | 9/1998 | Biorge et al. |
| 5,870,030 A | 2/1999 | DeLuca et al. |
| 5,923,016 A | 7/1999 | Fredregill et al. |
| 5,924,080 A | 7/1999 | Johnson |
| 5,945,653 A | 8/1999 | Walker et al. |
| 5,974,396 A | 10/1999 | Anderson et al. |
| 6,035,280 A | 3/2000 | Christensen |
| 6,061,660 A | 5/2000 | Eggleston et al. |
| 6,067,529 A | 5/2000 | Ray et al. |
| 6,070,147 A | 5/2000 | Harms et al. |
| 6,119,101 A | 9/2000 | Peckover |
| 6,216,129 B1 | 4/2001 | Eldering |
| 6,222,914 B1 | 4/2001 | McMullin |
| 6,282,522 B1 | 8/2001 | Davis et al. |
| 6,285,983 B1 | 9/2001 | Jenkins |
| 6,292,786 B1 | 9/2001 | Deaton et al. |
| 6,298,330 B1 | 10/2001 | Gardenswartz et al. |
| 6,318,631 B1 | 11/2001 | Halperin |
| 6,318,911 B1 | 11/2001 | Kitahara |
| 6,321,201 B1 | 11/2001 | Dahl |
| 6,332,126 B1 | 12/2001 | Peirce et al. |
| 6,334,108 B1 | 12/2001 | Deaton et al. |
| 6,334,110 B1 | 12/2001 | Walter et al. |
| 6,377,935 B1 | 4/2002 | Deaton et al. |
| 6,505,046 B1 | 1/2003 | Baker |
| 6,505,168 B1 | 1/2003 | Rothman et al. |
| 6,519,571 B1 | 2/2003 | Guheen et al. |
| 6,578,006 B1 | 6/2003 | Saito et al. |
| 6,606,745 B2 | 8/2003 | Maggio |
| 6,647,257 B2 | 11/2003 | Owensby |
| 6,685,093 B2 | 2/2004 | Challa et al. |
| 6,775,539 B2 | 8/2004 | Deshpande |
| 6,856,992 B2 | 2/2005 | Britton et al. |
| 6,877,665 B2 | 4/2005 | Challa et al. |
| 6,901,406 B2 | 5/2005 | Nabe et al. |
| 6,912,398 B1 | 6/2005 | Domnitz |
| 6,922,686 B2 | 7/2005 | Okamoto et al. |
| 6,938,022 B1 | 8/2005 | Singhal |
| 6,941,376 B2 | 9/2005 | Mitchell et al. |
| 6,996,560 B1 | 2/2006 | Choi et al. |
| 7,003,476 B1 | 2/2006 | Samra et al. |
| 7,013,286 B1 | 3/2006 | Aggarwal et al. |
| 7,024,374 B1 | 4/2006 | Day et al. |
| 7,024,409 B2 | 4/2006 | Iyengar |
| 7,035,855 B1 | 4/2006 | Kilger et al. |
| 7,039,599 B2 | 5/2006 | Merriman et al. |
| 7,054,830 B1 | 5/2006 | Eggleston et al. |
| 7,062,510 B1 | 6/2006 | Eldering |
| 7,072,847 B2 | 7/2006 | Ulenas et al. |
| 7,107,249 B2 | 9/2006 | Dively et al. |
| 7,120,590 B1 | 10/2006 | Eisen et al. |
| 7,158,943 B2 | 1/2007 | van der Riet |
| 7,158,955 B2 | 1/2007 | Diveley et al. |
| 7,177,822 B2 | 2/2007 | Mahmood et al. |
| 7,181,412 B1 | 2/2007 | Fulgoni et al. |
| 7,194,422 B1 | 3/2007 | St. John Killick |
| 7,225,142 B1 | 5/2007 | Apte et al. |
| 7,257,545 B1 | 8/2007 | Hung |
| 7,260,837 B2 | 8/2007 | Abraham et al. |
| 7,264,152 B2 | 9/2007 | Tsuei et al. |
| 7,269,578 B2 | 9/2007 | Sweeney |
| 7,299,194 B1 | 11/2007 | Manganaris et al. |
| 7,308,254 B1 | 12/2007 | Rissanen |
| 7,328,169 B2 | 2/2008 | Temares et al. |
| 7,330,110 B1 | 2/2008 | Heintzman et al. |
| 7,337,127 B1 | 2/2008 | Smith et al. |
| 7,340,438 B2 | 3/2008 | Nordman et al. |
| 7,360,251 B2 | 4/2008 | Spalink et al. |
| 7,373,311 B2 | 5/2008 | Lambert et al. |
| 7,401,032 B1 | 7/2008 | Golden et al. |
| 7,424,439 B1 | 9/2008 | Fayyad et al. |
| 7,424,441 B2 | 9/2008 | George et al. |
| 7,444,658 B1 | 10/2008 | Matz |
| 7,464,859 B1 | 12/2008 | Hawkins |
| 7,467,106 B1 | 12/2008 | Levine et al. |
| 7,493,655 B2 | 2/2009 | Brown |
| 7,526,485 B2 | 4/2009 | Hagan et al. |
| 7,529,687 B1 | 5/2009 | Phan |
| 7,536,360 B2 | 5/2009 | Stolfo et al. |
| 7,552,069 B2 | 6/2009 | Kepecs |
| 7,562,030 B1 | 7/2009 | Shapira et al. |
| 7,578,435 B2 | 8/2009 | Suk |
| 7,613,628 B2 | 11/2009 | Ariff et al. |
| 7,668,785 B1 | 2/2010 | Hammad |
| 7,729,977 B2 | 6/2010 | Xiao et al. |
| 7,747,524 B2 | 6/2010 | Brown |
| 7,792,518 B2 | 9/2010 | Trioano et al. |
| 7,912,751 B1 | 3/2011 | Allos |
| 7,937,291 B2 | 5/2011 | Carlson et al. |
| 7,970,705 B2 | 6/2011 | Patterson |
| 8,019,685 B2 | 9/2011 | Patterson |
| 8,099,318 B2 | 1/2012 | Moukas et al. |
| 8,229,819 B2 | 7/2012 | Ransom et al. |
| 8,311,845 B2 | 11/2012 | Vengroff et al. |
| 8,313,023 B1 | 11/2012 | McGhie et al. |
| 8,341,038 B1 | 12/2012 | Rolf et al. |
| 8,342,399 B1 | 1/2013 | McGhie et al. |
| 8,355,948 B2 | 1/2013 | Mason |
| 8,448,072 B1 | 5/2013 | Lai et al. |
| 8,478,692 B2 | 7/2013 | Carlson et al. |
| 8,511,550 B1 | 8/2013 | McGhie et al. |
| 8,554,670 B1 | 10/2013 | Blank et al. |
| 8,670,925 B2 | 3/2014 | Gluck |
| 8,750,906 B2 | 6/2014 | Winkler et al. |
| 8,751,295 B2 | 6/2014 | Tiku et al. |
| 9,058,604 B2 | 6/2015 | Carr et al. |
| 9,076,303 B1 | 7/2015 | Park et al. |
| 9,097,544 B2 | 8/2015 | Dhanani et al. |
| 2001/0027413 A1 | 10/2001 | Bhutta |
| 2001/0037205 A1 | 11/2001 | Joao |
| 2001/0049620 A1 | 12/2001 | Blasko |
| 2001/0054003 A1 | 12/2001 | Chien et al. |
| 2002/0002597 A1 | 1/2002 | Morrell |
| 2002/0004733 A1 | 1/2002 | Addante |
| 2002/0042738 A1 | 4/2002 | Srinivasan et al. |
| 2002/0046187 A1 | 4/2002 | Vargas et al. |
| 2002/0049644 A1 | 4/2002 | Kargman |
| 2002/0049664 A1 | 4/2002 | Hoffman et al. |
| 2002/0053076 A1 | 5/2002 | Landesmann |
| 2002/0059100 A1 | 5/2002 | Shore |
| 2002/0060246 A1 | 5/2002 | Gobburu et al. |
| 2002/0065713 A1 | 5/2002 | Awada et al. |
| 2002/0065723 A1 | 5/2002 | Anderson et al. |
| 2002/0070278 A1 | 6/2002 | Hung et al. |
| 2002/0072972 A1 | 6/2002 | Lamont |
| 2002/0077871 A1 | 6/2002 | Udelhoven et al. |
| 2002/0082918 A1 | 6/2002 | Warwick |
| 2002/0082920 A1 | 6/2002 | Austin et al. |
| 2002/0091569 A1 | 7/2002 | Kitaura et al. |
| 2002/0095333 A1 | 7/2002 | Jokinen et al. |
| 2002/0099649 A1 | 7/2002 | Lee et al. |
| 2002/0102993 A1 | 8/2002 | Hendrey et al. |
| 2002/0103703 A1 | 8/2002 | Spetalnick |
| 2002/0123928 A1 | 9/2002 | Eldering et al. |
| 2002/0128916 A1 | 9/2002 | Beinecke |

(56) References Cited

U.S. PATENT DOCUMENTS

| | | |
|---|---|---|
| 2002/0138346 A1 | 9/2002 | Kodaka et al. |
| 2002/0174013 A1 | 11/2002 | Freeman et al. |
| 2002/0174036 A1 | 11/2002 | Coyle |
| 2003/0018530 A1 | 1/2003 | Walker et al. |
| 2003/0033179 A1 | 2/2003 | Katz et al. |
| 2003/0033242 A1 | 2/2003 | Lynch et al. |
| 2003/0046153 A1 | 3/2003 | Robibero |
| 2003/0047602 A1 | 3/2003 | Iida et al. |
| 2003/0058261 A1 | 3/2003 | Challa et al. |
| 2003/0093314 A1 | 5/2003 | Leung et al. |
| 2003/0191832 A1 | 10/2003 | Satyavolu et al. |
| 2003/0212595 A1 | 11/2003 | Antonucci |
| 2003/0220841 A1 | 11/2003 | Maritzen |
| 2003/0225618 A1 | 12/2003 | Hessburg et al. |
| 2003/0225630 A1 | 12/2003 | Kakuta |
| 2003/0230630 A1 | 12/2003 | Whipple et al. |
| 2004/0010447 A1 | 1/2004 | Asayama |
| 2004/0019518 A1 | 1/2004 | Abraham et al. |
| 2004/0054575 A1 | 3/2004 | Marshall |
| 2004/0054581 A1 | 3/2004 | Redford et al. |
| 2004/0054591 A1 | 3/2004 | Spaeth et al. |
| 2004/0093512 A1 | 5/2004 | Sample |
| 2004/0122735 A1 | 6/2004 | Meshkin |
| 2004/0122736 A1 | 6/2004 | Strock et al. |
| 2004/0148224 A1 | 7/2004 | Gauthier et al. |
| 2004/0167815 A1 | 8/2004 | DeLaHunt |
| 2004/0193685 A1 | 9/2004 | Proehl |
| 2004/0225509 A1 | 11/2004 | Andre |
| 2004/0225603 A1 | 11/2004 | Allen et al. |
| 2004/0267611 A1 | 12/2004 | Hoerenz |
| 2005/0060248 A1 | 3/2005 | ONeal |
| 2005/0071225 A1 | 3/2005 | Bortolin et al. |
| 2005/0071227 A1 | 3/2005 | Hammad et al. |
| 2005/0071235 A1 | 3/2005 | Nguyen et al. |
| 2005/0125342 A1 | 6/2005 | Schiff |
| 2005/0131761 A1 | 6/2005 | Trika et al. |
| 2005/0133590 A1 | 6/2005 | Rettenmyer et al. |
| 2005/0144074 A1 | 6/2005 | Fredregill et al. |
| 2005/0160002 A1 | 7/2005 | Roetter et al. |
| 2005/0210387 A1 | 9/2005 | Alagappan et al. |
| 2005/0216334 A1 | 9/2005 | Mehrabani-Farsi |
| 2005/0216823 A1 | 9/2005 | Petersen et al. |
| 2005/0240474 A1 | 10/2005 | Li |
| 2005/0267812 A1 | 12/2005 | Jensen et al. |
| 2006/0002189 A1 | 1/2006 | Berkman |
| 2006/0004613 A1 | 1/2006 | Roller et al. |
| 2006/0053056 A1 | 3/2006 | Alspach-Goss et al. |
| 2006/0085252 A1 | 4/2006 | Kersenbrock |
| 2006/0085260 A1 | 4/2006 | Yamagishi |
| 2006/0085263 A1 | 4/2006 | Greer et al. |
| 2006/0111967 A1 | 5/2006 | Forbes |
| 2006/0122921 A1 | 6/2006 | Comerford et al. |
| 2006/0143071 A1 | 6/2006 | Hofmann |
| 2006/0143075 A1 | 6/2006 | Carr et al. |
| 2006/0161527 A1 | 7/2006 | Dwork et al. |
| 2006/0167818 A1 | 7/2006 | Wentker et al. |
| 2006/0173736 A1 | 8/2006 | Huyser et al. |
| 2006/0178957 A1 | 8/2006 | LeClaire |
| 2006/0190337 A1 | 8/2006 | Ayers et al. |
| 2006/0200403 A1 | 9/2006 | Friss |
| 2006/0212900 A1 | 9/2006 | Ismail et al. |
| 2006/0235746 A1 | 10/2006 | Hammond et al. |
| 2006/0242017 A1 | 10/2006 | Libes et al. |
| 2006/0247978 A1 | 11/2006 | Davis |
| 2006/0289631 A1 | 12/2006 | Stretch et al. |
| 2006/0293948 A1 | 12/2006 | Weinblatt |
| 2006/0293959 A1 | 12/2006 | Hogan |
| 2007/0027771 A1 | 2/2007 | Collins et al. |
| 2007/0038516 A1 | 2/2007 | Apple et al. |
| 2007/0045405 A1 | 3/2007 | Rothschild |
| 2007/0055597 A1 | 3/2007 | Patel et al. |
| 2007/0067267 A1 | 3/2007 | Ives |
| 2007/0067297 A1 | 3/2007 | Kublickis |
| 2007/0084917 A1 | 4/2007 | Fajkowski |
| 2007/0094114 A1 | 4/2007 | Bufford et al. |
| 2007/0100691 A1 | 5/2007 | Patterson |
| 2007/0106464 A1 | 5/2007 | Yamada |
| 2007/0106556 A1 | 5/2007 | Edwards et al. |
| 2007/0124201 A1 | 5/2007 | Hu et al. |
| 2007/0136131 A1 | 6/2007 | Mankoff |
| 2007/0136135 A1 | 6/2007 | Loeger et al. |
| 2007/0156470 A1 | 7/2007 | Granucci et al. |
| 2007/0162377 A1 | 7/2007 | Williams |
| 2007/0192121 A1 | 8/2007 | Routson |
| 2007/0192122 A1 | 8/2007 | Routson et al. |
| 2007/0208671 A1 | 9/2007 | Brown et al. |
| 2007/0208704 A1 | 9/2007 | Ives |
| 2007/0219865 A1 | 9/2007 | Leining |
| 2007/0219866 A1 | 9/2007 | Wolf et al. |
| 2007/0226056 A1 | 9/2007 | Belanger et al. |
| 2007/0226061 A1 | 9/2007 | Chen et al. |
| 2007/0239521 A1 | 10/2007 | Khadpe et al. |
| 2007/0239532 A1 | 10/2007 | Benson et al. |
| 2007/0241189 A1 | 10/2007 | Slavin et al. |
| 2007/0260523 A1 | 11/2007 | Schadt et al. |
| 2007/0260736 A1 | 11/2007 | Miller |
| 2007/0265920 A1 | 11/2007 | Bistriceanu et al. |
| 2007/0265921 A1 | 11/2007 | Rempe et al. |
| 2007/0265923 A1 | 11/2007 | Krassner et al. |
| 2007/0282681 A1 | 12/2007 | Shubert et al. |
| 2008/0004884 A1 | 1/2008 | Flake et al. |
| 2008/0027810 A1 | 1/2008 | Lerner et al. |
| 2008/0040229 A1 | 2/2008 | Gholston |
| 2008/0059302 A1 | 3/2008 | Fordyce, III et al. |
| 2008/0059303 A1 | 3/2008 | Fordyce |
| 2008/0059306 A1 | 3/2008 | Fordyce et al. |
| 2008/0059307 A1* | 3/2008 | Fordyce, III ........... G06Q 30/00 705/14.27 |
| 2008/0071587 A1 | 3/2008 | Granucci et al. |
| 2008/0071680 A1 | 3/2008 | Sheets |
| 2008/0077487 A1 | 3/2008 | Davis et al. |
| 2008/0082393 A1 | 4/2008 | Ozzie et al. |
| 2008/0082418 A1 | 4/2008 | Fordyce et al. |
| 2008/0103887 A1 | 5/2008 | Oldham et al. |
| 2008/0103968 A1 | 5/2008 | Bies et al. |
| 2008/0120182 A1 | 5/2008 | Arnold et al. |
| 2008/0120218 A1 | 5/2008 | Reid et al. |
| 2008/0133345 A1 | 6/2008 | Cordery et al. |
| 2008/0133350 A1 | 6/2008 | White et al. |
| 2008/0133351 A1 | 6/2008 | White et al. |
| 2008/0133366 A1 | 6/2008 | Evans et al. |
| 2008/0134228 A1 | 6/2008 | Dion et al. |
| 2008/0147481 A1 | 6/2008 | Robinson et al. |
| 2008/0154654 A1 | 6/2008 | Niessen et al. |
| 2008/0154703 A1 | 6/2008 | Flake et al. |
| 2008/0154704 A1 | 6/2008 | Flake et al. |
| 2008/0154727 A1 | 6/2008 | Carlson |
| 2008/0162258 A1 | 7/2008 | Kala et al. |
| 2008/0163257 A1 | 7/2008 | Carlson et al. |
| 2008/0167000 A1 | 7/2008 | Wentker et al. |
| 2008/0167991 A1 | 7/2008 | Carlson et al. |
| 2008/0167992 A1 | 7/2008 | Kokernak et al. |
| 2008/0177602 A1 | 7/2008 | Sopher et al. |
| 2008/0184117 A1 | 7/2008 | Alsbury et al. |
| 2008/0195465 A1 | 8/2008 | Redmond et al. |
| 2008/0195466 A1 | 8/2008 | Wright |
| 2008/0195473 A1 | 8/2008 | Laramy et al. |
| 2008/0201226 A1 | 8/2008 | Carlson et al. |
| 2008/0215429 A1 | 9/2008 | Ramer et al. |
| 2008/0215436 A1 | 9/2008 | Roberts |
| 2008/0217397 A1 | 9/2008 | Degliantoni et al. |
| 2008/0221972 A1 | 9/2008 | Megdal et al. |
| 2008/0221975 A1 | 9/2008 | Steul |
| 2008/0222038 A1 | 9/2008 | Eden et al. |
| 2008/0228563 A1 | 9/2008 | Zellner et al. |
| 2008/0228582 A1 | 9/2008 | Fordyce et al. |
| 2008/0233984 A1 | 9/2008 | Franklin |
| 2008/0235091 A1 | 9/2008 | Holliday |
| 2008/0235243 A1 | 9/2008 | Lee et al. |
| 2008/0242317 A1 | 10/2008 | Abhyanker |
| 2008/0248815 A1 | 10/2008 | Busch |
| 2008/0262915 A1 | 10/2008 | Gojkovic et al. |
| 2008/0300973 A1 | 12/2008 | DeWitt et al. |
| 2008/0313011 A1 | 12/2008 | Rose et al. |

(56) References Cited

U.S. PATENT DOCUMENTS

| | | |
|---|---|---|
| 2008/0318559 A1 | 12/2008 | Porco |
| 2008/0319843 A1 | 12/2008 | Moser et al. |
| 2008/0319847 A1 | 12/2008 | Shepard |
| 2008/0319889 A1 | 12/2008 | Hammad |
| 2008/0320512 A1 | 12/2008 | Knight |
| 2009/0006183 A1 | 1/2009 | Paintin et al. |
| 2009/0006203 A1 | 1/2009 | Fordyce et al. |
| 2009/0006214 A1 | 1/2009 | Lerman et al. |
| 2009/0006363 A1 | 1/2009 | Canny et al. |
| 2009/0018895 A1 | 1/2009 | Weinblatt et al. |
| 2009/0030793 A1 | 1/2009 | Fordyce |
| 2009/0043593 A1 | 2/2009 | Herbrich et al. |
| 2009/0070207 A1 | 3/2009 | Engel et al. |
| 2009/0070219 A1 | 3/2009 | DAngelo et al. |
| 2009/0076896 A1 | 3/2009 | DeWitt et al. |
| 2009/0076925 A1 | 3/2009 | DeWitt et al. |
| 2009/0081990 A1 | 3/2009 | Granucci et al. |
| 2009/0089169 A1 | 4/2009 | Gupta et al. |
| 2009/0099932 A1 | 4/2009 | Ahopelto |
| 2009/0112721 A1 | 4/2009 | Hammad et al. |
| 2009/0119160 A1 | 5/2009 | Woda et al. |
| 2009/0119167 A1 | 5/2009 | Kendall et al. |
| 2009/0132346 A1 | 5/2009 | Duggal et al. |
| 2009/0132347 A1 | 5/2009 | Anderson et al. |
| 2009/0132366 A1 | 5/2009 | Lam et al. |
| 2009/0144201 A1 | 6/2009 | Gierkink et al. |
| 2009/0150211 A1 | 6/2009 | Bayne |
| 2009/0150232 A1 | 6/2009 | Tyler et al. |
| 2009/0157511 A1 | 6/2009 | Spinnell et al. |
| 2009/0171747 A1 | 7/2009 | Lanning et al. |
| 2009/0172551 A1 | 7/2009 | Kane et al. |
| 2009/0172728 A1 | 7/2009 | Shkedi et al. |
| 2009/0182634 A1 | 7/2009 | Park et al. |
| 2009/0192882 A1 | 7/2009 | Narahashi et al. |
| 2009/0203387 A1 | 8/2009 | Wold et al. |
| 2009/0216579 A1 | 8/2009 | Zen et al. |
| 2009/0216616 A1 | 8/2009 | Wang et al. |
| 2009/0216620 A1 | 8/2009 | Lee |
| 2009/0222323 A1 | 9/2009 | Kelly et al. |
| 2009/0222337 A1 | 9/2009 | Sergiades |
| 2009/0222348 A1 | 9/2009 | Ransom et al. |
| 2009/0234708 A1 | 9/2009 | Heiser et al. |
| 2009/0234711 A1 | 9/2009 | Ramer et al. |
| 2009/0234737 A1 | 9/2009 | Sarelson et al. |
| 2009/0248496 A1 | 10/2009 | Hueter et al. |
| 2009/0248511 A1 | 10/2009 | Mehta et al. |
| 2009/0249384 A1 | 10/2009 | Fang et al. |
| 2009/0254414 A1 | 10/2009 | Schwarz et al. |
| 2009/0259518 A1 | 10/2009 | Harvey et al. |
| 2009/0265228 A1 | 10/2009 | Sterling et al. |
| 2009/0271275 A1 | 10/2009 | Regmi et al. |
| 2009/0271305 A1 | 10/2009 | Lal et al. |
| 2009/0271327 A1 | 10/2009 | Lal et al. |
| 2009/0276304 A1 | 11/2009 | Dorr |
| 2009/0299941 A1 | 12/2009 | McColgan et al. |
| 2009/0319638 A1 | 12/2009 | Faith et al. |
| 2009/0327151 A1 | 12/2009 | Carlson et al. |
| 2009/0327286 A1 | 12/2009 | Ge et al. |
| 2009/0327331 A1 | 12/2009 | Mathew et al. |
| 2010/0008255 A1 | 1/2010 | Khosravy et al. |
| 2010/0010888 A1 | 1/2010 | Maertz |
| 2010/0017275 A1 | 1/2010 | Carlson et al. |
| 2010/0030688 A1 | 2/2010 | Patterson |
| 2010/0049588 A1 | 2/2010 | Debow |
| 2010/0049620 A1 | 2/2010 | Debow |
| 2010/0057549 A1 | 3/2010 | Boal |
| 2010/0057553 A1 | 3/2010 | Ameiss et al. |
| 2010/0057573 A1 | 3/2010 | Singhal |
| 2010/0082420 A1 | 4/2010 | Trifiletti et al. |
| 2010/0090901 A1 | 4/2010 | Smith et al. |
| 2010/0106569 A1 | 4/2010 | Grimes |
| 2010/0106570 A1 | 4/2010 | Radu et al. |
| 2010/0114677 A1 | 5/2010 | Carlson et al. |
| 2010/0114683 A1 | 5/2010 | Wessels et al. |
| 2010/0114703 A1 | 5/2010 | Steelberg et al. |
| 2010/0125490 A1 | 5/2010 | Kiciman et al. |
| 2010/0131415 A1 | 5/2010 | Sartipi |
| 2010/0136898 A1 | 6/2010 | Farrow |
| 2010/0138838 A1 | 6/2010 | Lin et al. |
| 2010/0145778 A1 | 6/2010 | Fordyce et al. |
| 2010/0145786 A1 | 6/2010 | Fordyce, III et al. |
| 2010/0153206 A1 | 6/2010 | Gersovitz |
| 2010/0167823 A1 | 7/2010 | Winkler |
| 2010/0169170 A1 | 7/2010 | Fordyce et al. |
| 2010/0174596 A1 | 7/2010 | Gilman et al. |
| 2010/0174623 A1 | 7/2010 | McPhie et al. |
| 2010/0211694 A1 | 8/2010 | Razmov et al. |
| 2010/0241498 A1 | 9/2010 | Chung et al. |
| 2010/0250351 A1 | 9/2010 | Gillenson et al. |
| 2010/0262461 A1 | 10/2010 | Bohannon |
| 2010/0274566 A1 | 10/2010 | Carlson |
| 2010/0274625 A1 | 10/2010 | Carlson |
| 2010/0274627 A1 | 10/2010 | Carlson |
| 2010/0274655 A1 | 10/2010 | Postrel |
| 2010/0274866 A1 | 10/2010 | Hammad et al. |
| 2010/0280881 A1 | 11/2010 | Faith et al. |
| 2010/0280914 A1 | 11/2010 | Carlson |
| 2010/0306029 A1 | 12/2010 | Jolley |
| 2010/0325047 A1 | 12/2010 | Carlson et al. |
| 2010/0325048 A1 | 12/2010 | Carlson et al. |
| 2011/0010292 A1 | 1/2011 | Giordano et al. |
| 2011/0029430 A1 | 2/2011 | Norris et al. |
| 2011/0029440 A1 | 2/2011 | Motoyama et al. |
| 2011/0035265 A1 | 2/2011 | King et al. |
| 2011/0035288 A1 | 2/2011 | Clyne |
| 2011/0047012 A1 | 2/2011 | Sherman |
| 2011/0047017 A1 | 2/2011 | Lieblang et al. |
| 2011/0054981 A1 | 3/2011 | Faith et al. |
| 2011/0065376 A1 | 3/2011 | Forutanpour et al. |
| 2011/0072035 A1 | 3/2011 | Gaucas et al. |
| 2011/0078004 A1 | 3/2011 | Swanson, Sr. |
| 2011/0087530 A1 | 4/2011 | Fordyce et al. |
| 2011/0087531 A1 | 4/2011 | Winters et al. |
| 2011/0093324 A1 | 4/2011 | Fordyce et al. |
| 2011/0125509 A1 | 5/2011 | Lidstrom et al. |
| 2011/0125565 A1 | 5/2011 | MacIlwaine et al. |
| 2011/0131096 A1 | 6/2011 | Frew et al. |
| 2011/0131135 A1 | 6/2011 | Carlson et al. |
| 2011/0161142 A1 | 6/2011 | Dunn et al. |
| 2011/0161150 A1 | 6/2011 | Steffens et al. |
| 2011/0202401 A1 | 8/2011 | Magadi et al. |
| 2011/0208575 A1 | 8/2011 | Bansal et al. |
| 2011/0231258 A1 | 9/2011 | Winters |
| 2011/0246306 A1 | 10/2011 | Blackhurst et al. |
| 2011/0258026 A1 | 10/2011 | Prince |
| 2011/0270719 A1 | 11/2011 | Hollars et al. |
| 2011/0288906 A1 | 11/2011 | Thomas et al. |
| 2011/0288918 A1 | 11/2011 | Cervenka et al. |
| 2011/0302011 A1 | 12/2011 | Yoder et al. |
| 2011/0307318 A1 | 12/2011 | LaPorte et al. |
| 2011/0313837 A1 | 12/2011 | Katz et al. |
| 2012/0036034 A1 | 2/2012 | Golden et al. |
| 2012/0059702 A1 | 3/2012 | Yoder et al. |
| 2012/0066062 A1 | 3/2012 | Yoder et al. |
| 2012/0066064 A1 | 3/2012 | Yoder et al. |
| 2012/0072997 A1 | 3/2012 | Carlson et al. |
| 2012/0078699 A1 | 3/2012 | Carlson et al. |
| 2012/0101894 A1 | 4/2012 | Sterling et al. |
| 2012/0130859 A1 | 5/2012 | Wolfe et al. |
| 2012/0136704 A1 | 5/2012 | Carlson et al. |
| 2012/0150609 A1 | 6/2012 | Walker et al. |
| 2012/0179367 A1 | 7/2012 | Niu |
| 2012/0191525 A1 | 7/2012 | Singh et al. |
| 2012/0197720 A1 | 8/2012 | Bezancon et al. |
| 2012/0209675 A1 | 8/2012 | Tyler et al. |
| 2012/0209777 A1 | 8/2012 | Tredeau et al. |
| 2012/0215637 A1 | 8/2012 | Hermann |
| 2012/0239472 A1 | 9/2012 | Tyler et al. |
| 2012/0239479 A1 | 9/2012 | Amaro et al. |
| 2012/0239498 A1 | 9/2012 | Ramer et al. |
| 2012/0244948 A1 | 9/2012 | Dhillon et al. |
| 2012/0252558 A1 | 10/2012 | Mishra et al. |
| 2012/0259695 A1 | 10/2012 | Glassman et al. |
| 2012/0259704 A1 | 10/2012 | Monteverde |

(56) References Cited

U.S. PATENT DOCUMENTS

| | | |
|---|---|---|
| 2012/0259842 A1 | 10/2012 | Oman et al. |
| 2012/0265545 A1 | 10/2012 | Hwang et al. |
| 2012/0265591 A1 | 10/2012 | Hwang et al. |
| 2012/0271689 A1 | 10/2012 | Etheredge et al. |
| 2012/0271691 A1 | 10/2012 | Hammad et al. |
| 2012/0271697 A1 | 10/2012 | Gilman et al. |
| 2012/0271703 A1 | 10/2012 | Postrel |
| 2012/0278173 A1 | 11/2012 | Vaidyanathan et al. |
| 2012/0290950 A1 | 11/2012 | Rapaport et al. |
| 2012/0303425 A1 | 11/2012 | Katzin et al. |
| 2012/0310670 A1 | 12/2012 | Pruitt |
| 2012/0310838 A1 | 12/2012 | Harris et al. |
| 2012/0323664 A1 | 12/2012 | Klems |
| 2012/0330744 A1 | 12/2012 | Aissa |
| 2013/0006709 A1 | 1/2013 | Kosta |
| 2013/0030934 A1 | 1/2013 | Bakshi et al. |
| 2013/0046621 A1 | 2/2013 | Asseoff et al. |
| 2013/0046626 A1 | 2/2013 | Grigg et al. |
| 2013/0060585 A1 | 3/2013 | Hornbaker et al. |
| 2013/0080225 A1 | 3/2013 | Rajaram |
| 2013/0080237 A1 | 3/2013 | Hart |
| 2013/0085869 A1 | 4/2013 | Carlson et al. |
| 2013/0124417 A1 | 5/2013 | Spears et al. |
| 2013/0132205 A1 | 5/2013 | Harris |
| 2013/0132283 A1 | 5/2013 | Hayhow et al. |
| 2013/0144704 A1 | 6/2013 | Williams et al. |
| 2013/0151323 A1 | 6/2013 | Shepard et al. |
| 2013/0173364 A1 | 7/2013 | Choong Cheng Shien et al. |
| 2013/0179264 A1 | 7/2013 | Wilson |
| 2013/0191195 A1 | 7/2013 | Carlson et al. |
| 2013/0191198 A1 | 7/2013 | Carlson et al. |
| 2013/0204703 A1 | 8/2013 | Carlson et al. |
| 2013/0210461 A1 | 8/2013 | Moldaysky et al. |
| 2013/0218664 A1 | 8/2013 | Carlson et al. |
| 2013/0218670 A1 | 8/2013 | Spears et al. |
| 2013/0238413 A1 | 9/2013 | Carlson et al. |
| 2013/0246148 A1 | 9/2013 | Ross et al. |
| 2013/0246150 A1 | 9/2013 | Ovick et al. |
| 2013/0262188 A1 | 10/2013 | Leibner et al. |
| 2013/0332255 A1 | 12/2013 | Carlson et al. |
| 2013/0346170 A1 | 12/2013 | Epstein et al. |
| 2014/0074575 A1 | 3/2014 | Rappoport |
| 2014/0129306 A1 | 5/2014 | Rappoport et al. |
| 2014/0129313 A1 | 5/2014 | Rappoport et al. |
| 2014/0172534 A1 | 6/2014 | Spears et al. |
| 2015/0120429 A1 | 4/2015 | Salmon et al. |
| 2015/0134528 A1 | 5/2015 | Fineman et al. |

FOREIGN PATENT DOCUMENTS

| | | | |
|---|---|---|---|
| KR | 20010096672 A | | 11/2001 |
| KR | 20030008894 A | | 1/2003 |
| KR | 20040045622 A | | 6/2004 |
| KR | 20040107715 A | | 12/2004 |
| KR | 20050113156 A | | 12/2005 |
| KR | 20070030415 A | | 3/2007 |
| KR | 20080002731 A | | 1/2008 |
| KR | 20080104398 A | | 12/2008 |
| WO | 1999022328 | A1 | 5/1999 |
| WO | 1999050775 | A1 | 10/1999 |
| WO | 2000003328 | A1 | 1/2000 |
| WO | 2000060435 | A2 | 10/2000 |
| WO | 2000062231 | A1 | 10/2000 |
| WO | 2001037183 | A1 | 5/2001 |
| WO | 2001039023 | A2 | 5/2001 |
| WO | 2001057758 | A1 | 8/2001 |
| WO | 2001093161 | A1 | 12/2001 |
| WO | 2002005116 | A2 | 1/2002 |
| WO | 2002014985 | A2 | 2/2002 |
| WO | 2002019229 | A2 | 3/2002 |
| WO | 2002042970 | A1 | 5/2002 |
| WO | 2002071187 | A2 | 9/2002 |
| WO | 2003025695 | A2 | 3/2003 |
| WO | 2003081376 | A2 | 10/2003 |
| WO | 2005001631 | A2 | 1/2005 |
| WO | 2005072382 | A2 | 8/2005 |
| WO | 2005076181 | A1 | 8/2005 |
| WO | 2006028739 | A2 | 3/2006 |
| WO | 2006126205 | A2 | 11/2006 |
| WO | 2007131258 | A1 | 11/2007 |
| WO | 2007136221 | A1 | 11/2007 |
| WO | 2008013945 | A2 | 1/2008 |
| WO | 2008023912 | A2 | 2/2008 |
| WO | 2008064343 | A1 | 5/2008 |
| WO | 2008067543 | A2 | 6/2008 |
| WO | 2008144643 | A1 | 11/2008 |
| WO | 2009144010 | A1 | 12/2009 |
| WO | 2010036915 | A2 | 4/2010 |

OTHER PUBLICATIONS

Cashmore, Pete, "YouTube Ads: YouHate Em," available at http://mashable.com/2009/04/05/youtube-ads-youhate-em/#, Apr. 5, 2009.

Credit Card Finder: "Airline Miles Reward Credit Cards"; http://www.plasticrewards.com/airline-miles-reward!, 2009, 2 pages.

Credit Card Finder: "Cash Back Reward Credit Cards"; http://www.plasticrewards.com/creditcard/cash-back-reward/, 2009, 3 pages.

Credit Card Finder: "Compare Cash Back Credit Cards and Credit Card Offers"; http://www.plasticrewards.com/, 2009, 1 page.

Credit Card Finder: "Gas Reward Credit Cards"; http://www.plasticrewards.com/creditcard/gas-reward/, 2009, 3 pages.

Credit Card Finder: "Hotel Reward Credit Cards"; http://www.plasticrewards.com/credit-card/hotel-reward/, 2009, 2 pages.

Credit Card Finder: "Reward Credit Cards"; http://www.plasticrewards.com/credit-card/reward/, 2009, 3 pages.

Credit Card Finder: "Travel Reward Credit Cards"; http://www.plasticrewards.com/credit-card/travel-reward, 2009, 3 pages.

CreditCardGuide.com: "Car rebate credit cards"; http://www.creditcardguide.com/car-rebate.html/, 2009, 2 pages.

CreditCardGuide.com: "Cash Back Credit Cards"; http://www.creditcardguide.com/cashback2.htmll, 2009, 2 pages.

CreditCardGuide.com: "Dining and entertainment credit cards"; http://www.creditcardguide.com/dining-entertainment.html/, 2009, 3 pages.

CreditCardGuide.com: "Financial reward credit cards"; http://www.creditcardguide.com/financial-reward-credit-cards.html/, 2009, 2 pages.

CreditCardGuide.com: "Foundation and charity credit cards"; http://www.creditcardguide.com/foundations-charities.html/, 2009, 3 pages.

CreditCardGuide.com: "Gas Rebate Credit Cards"; http://www.creditcardguide.com/gascards.html/, 2009, 2 pages.

CreditCardGuide.com: "Sports and outdoor enthusiast credit cards"; http://www.creditcardguide.com/sports-outdoors.html/, 2009, 2 pages.

CreditCardGuide.com: "Use Cash Back Credit Cards"; http://www.creditcardguide.com/cashback.html/, 2009, 3 pages.

CreditCardGuide.com: "Use home improvement reward credit cards"; http://www.creditcardguide.com/home-improvement-credit-cards.html/, 2009, 2 pages.

CreditCardGuide.com: "Use hotel reward credit cards and travel reward credit cards"; http://www.creditcardguide.com/hotel-reward-credit-cards.html/, 2009, 2 pages.

CreditCardGuide.com: "Use retail reward credit cards and brand name reward credit cards"; http//www.creditcardguide.com/retail-brand-credit-cards.html/, 2009, 2 pages.

CreditCardGuide.com: Use Reward Credit Cards"; http://www.creditcardguide.com/reward-point-credit-cards.html/, 2009, 3 pages.

CreditCardGuide.com: "With Airline Credit Cards, Frequent Flyer credit cards, and Travel Reward Credit Cards"; http://www.creditcardguide.com/airline-frequent-flyer- cards.html/, 2009,4 pages.

Li, Wen-Syan, "Knowledge Gathering and Matching in Heterogeneous Databases," Working Notes of the AAAI Spring Symposium on Information Gathering, pp. 116-1216, Mar. 27, 1995.

Mielikäinen, Taneli, "Privacy Problems with Anonymized Transaction Databases," 7th International Conference on Discovery Science, pp. 219-229, Oct. 2, 2004.

Punj, Girish et al. "Cluster Analysis in Marketing Research: Review and Suggestions for Application," Journal of Marketing Research, vol. 20, pp. 134-148, May 1983.

(56) References Cited

OTHER PUBLICATIONS

Van Grove, Jennifer, "Are Your Online Video Ads Driving Actual Offl ine Purchases?", available at http://mashable.com/2009/05/18/video-impact/#, May 18, 2009.

* cited by examiner

MERCHANT CONFIGURED ADVERTISED INCENTIVES FUNDED THROUGH STATEMENT CREDITS

CROSS-REFERENCE TO RELATED APPLICATIONS

This application is a continuation application of U.S. patent application Ser. No. 15/599,296, filed May 18, 2017, which is a continuation application of U.S. patent application Ser. No. 13/053,113, filed Mar. 21, 2011, now U.S. Pat. No. 9,697,520, issued Jul. 4, 2017, which claims the benefit of U.S. Provisional Patent Application No. 61/316,336, filed Mar. 22, 2010, the disclosures of which are hereby incorporated herein by reference in their entirety.

FIELD

Implementations generally relate to advertised incentives by merchants to encourage consumers to make or complete purchases facilitated and managed by an issuer or transaction handler, and more particularly to a statement credit incentive to a consumer's payment device account with the issuer or transaction handler offered by a merchant to encourage the consumer to make a purchase from the merchant and also on the consumer's account with the issuer or transaction handler.

BACKGROUND

Merchants often use techniques to prompt consumers into making a particular purchase. These techniques are commonly in the form of monetary incentives, relying on the principle that a lower price will result in increased sales. Merchants may employ these techniques, for example, to help clear inventory before a new season's merchandise is released, to ease the release of a new product, to increase sales near the end of the fiscal year, to compete with a competitor over particular products, or to generally spur sales.

Monetary incentives may come in the form of a "sale" (i.e. temporary reduction in price at the register), a mail-in rebate (i.e. a refund of part or all of the purchase price by mail), or a store credit (i.e. credit that can be applied to another store purchase). These incentives usually only apply to a particular product and have a time component. For example, a sale may only apply to a particular brand of dishwasher purchased on a particular holiday weekend and a rebate may only be valid for computers purchased within two weeks before the start of classes at a university.

For some credit transactions, a merchant may also use a statement credit as a monetary incentive. A statement credit is an amount refunded back to a credit account and which appears on the account holder's account statement. Using a statement credit as a monetary incentive involves two distinct transactions. In the first transaction, the merchant charges the full amount to a customer's credit account. In the second transaction, the amount of the monetary incentive is then refunded back to the customer's credit account as a statement credit.

Statement credit campaigns offer an advantage for merchants over other types of monetary incentive programs because a transaction handler, such as Visa Inc. or MasterCard Inc, largely handles the administration of the campaign. Once a statement credit campaign is arranged and initiated between a merchant and transaction handler, the transaction handler tracks the statement credit, matches the statement credit to qualifying purchases, and credits the amount of the statement credit to the purchaser's account. The transaction handler then collects the aggregate amount of the statement credits made to multiple purchasers from the merchant.

Transaction handlers also benefit from statement credit campaigns. These campaigns, in combination with other campaigns and programs, lead to increased loyalty to a particular transaction handler and increase the general usage of a particular handler. In addition, statement credit campaigns can also spur usage of one transaction handler over other transaction handlers in individual purchasing decisions because of the monetary incentives available.

One difficulty with statement credit campaigns is the effort required to set up such campaigns. One or more merchants must negotiate with a transaction handler to identify purchases that qualify under the campaign, the effective time period of the campaign, the procedure for dealing with returns of the purchased item, as well as other details. The complexity, time, and corresponding cost of setting up a statement credit campaign effectively limits such campaigns to large merchants or large product manufactures offering statement credits across multiple merchants. Small and medium sized businesses are effectively barred from using this type of monetary incentive due to the setup cost.

Once a statement credit campaign is set up, it is generally inflexible as to changes in the types of products, services, or effective time period. These elements are generally part of the collaboration between the transaction handler and merchant, and are not easily modified. Merchants are therefore locked into a specific statement credit configuration, such as for a set time or for a set product. This, unfortunately, prevents merchants from dynamically using this type of monetary incentive to push specific products or services on an as-needed basis. In addition, it is currently very difficult for a merchant to target a statement credit campaign to a specific individual or set of individuals. For example, it is currently difficult for an online store to target a statement credit to the top 10% of its most frequent customers. This current one-size-fits-all system for statement credit campaigns severely limits the merchant's use of such campaigns.

A general problem for merchants, especially small to mid-sized merchants, is how to efficiently administer any monetary incentive program where money is refunded to the purchaser, whether it is a rebate program, a store credit, or a statement credit campaign. Larger merchants may undertake this responsibility themselves. However, the more processing a merchant must undertake, the more likely the administrative costs of the program will outweigh any benefits. In order to reduce administrative costs, some merchants arrange for third parties to handle the processing and other administrative aspects of these programs. In any case, the projected benefit of the program must be substantially more than the administrative costs. A program with a low administration cost would therefore be more highly desired.

Therefore, there are many factors impeding the use of statement credits, especially by small and medium sized businesses and by larger businesses that may want to use statement credits in a flexible manner to target different products or different customers at different times. Accordingly, it would be an advance in the art of commerce to provide a system that enables merchants to independently establish statement credit campaigns, modify the details of the campaigns as desired, and offload the burden of processing the statement credit to the transaction handler.

SUMMARY

Implementations relate to a computer implemented method of receiving an account activation for an account of an account holder, receiving a statement credit trigger from a merchant and matching a purchase meeting the requirements for a qualifying purchase as defined in the statement credit trigger, made on an account of an account holder, e.g., an account with an issuer or with the merchant. The method may then comprise a transaction handler crediting the account of the account holder with an amount of the statement credit, collecting an amount of the qualifying transaction from the account, and collecting the amount of the statement credit from a responsible party, and paying to the merchant's account the collected amount for the qualifying transaction, not necessarily in that order.

In one implementation, the statement credit trigger is received from the account holder directly. In this implementation, the merchant embeds a script corresponding to the statement credit trigger on its retail website that allows the account holder, incident to making a qualifying purchase on the account holder's account, to interact directly with the scrip. This enables the account holder to apply for the statement credit identified in the statement credit trigger to the transaction handler, or agent thereof, from the merchant's website. Alternately, the account holder may also apply for the statement credit identified in the statement credit trigger directly from the transaction handler's website or a third party website instead of from the merchant's retail website. The third party web site can be an Etail site with links to the merchant's site or any web site that agrees to be an advertisement publisher, such as content web sites with an agreement with a search engine site such as Google that returns advertisements in relation to search responses, where the content web-site may get advertisements from such as Google to display on the content web-site, which also may have some relation to the content otherwise displayed on the content web-site. This could be, e.g., advertisements that Google itself might display with a search query response that identifies prominently the content web site.

In another implementation, the statement credit trigger is received directly from the merchant before, or simultaneously with, the execution of a transaction meeting the requirements of transaction information identifying a qualifying purchase, contained in the statement credit trigger. The transaction can be on the account of an account holder. The merchant provides the statement credit trigger to the transaction handler on behalf of the account holder. The account holder does not need to take any additional steps, aside from making the qualifying purchase on the account holder's account, for which the merchant has agreed with the transaction handler the statement credit will be applied.

A method and apparatus is disclosed which may comprise providing, via a computing device, a merchant interface allowing a merchant to create an advertised incentive trigger comprising an advertised incentive configuration, including defining a qualifying purchase transaction, and to activate the advertising incentive trigger; storing in a database the advertised incentive configuration and an indication that the merchant has activated the advertising incentive trigger; receiving, via the computing device, while the advertising incentive trigger is activated, an authorization request from the merchant to authorize a qualifying purchase transaction; and executing, via the computing device, the advertised incentive with respect to a consumer payment system account of a consumer upon which consumer payment system account the qualifying purchase transaction was authorized.

The method and apparatus may include the interface comprising a portal to a transaction handler transaction handling system and the advertised incentive may comprise a statement credit incentive. To activate the advertised incentive trigger may include a user registering to obtain the advertised incentive.

The method and apparatus may further comprise crediting, via the computing device, the consumer payment account of the account holder according to the statement credit; debiting, via the computing device, the consumer payment account of the account holder according to the qualifying purchase transaction; and, debiting, via the computing device, an account of at least one entity responsible for funding the statement credit.

Defining the qualifying purchase transaction may comprise at least one of: defining one of a product and a service, to be purchased in the qualifying purchase transaction; defining a time period in which to complete the qualifying purchase; defining a consumer purchase account consumer purchase device with which to complete the qualified purchase transaction; and defining a merchant location where the qualifying purchase transaction is to occur. The system and method may comprise a tangible machine readable medium storing instructions, the instructions, when executed by a computing device, causing the computing device to perform the method.

DETAILED DESCRIPTION

Figure 1:
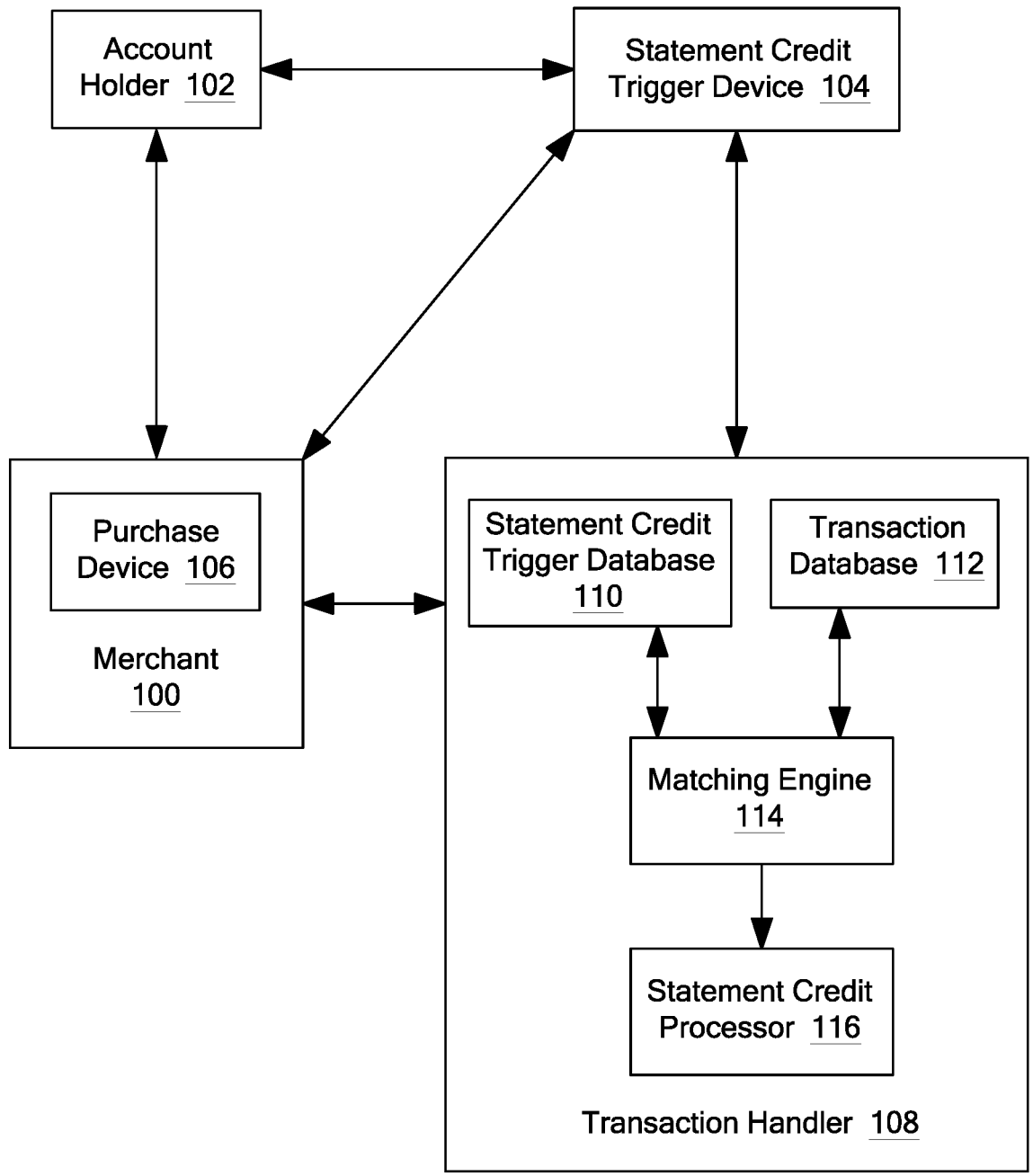
FIG. 1 depicts a block diagram illustrating the functional blocks of an exemplary implementation, where each block performs a function and does not necessarily represent a physical item.

Referring to FIG. 1, a block diagram illustrates functional blocks by which a Merchant 100 displays an advertised incentive to an Account Holder 102 while engaged in on-line or other shopping with the Merchant 100. The advertised incentive may be displayed on the Merchant's 100 website or in the Merchant's 100 brick and mortar store, or otherwise dynamically conveyed to the Account Holder, such as on an advertisement publisher web site. An advertised incentive according to aspects of an embodiment of the presently disclosed subject matter also is referred to as a statement credit trigger, e.g., when the advertised incentive is a statement credit. Statement credit triggers both announce the statement credit advertised incentive to the Account Holder and also allow for statement credits to be tracked and matched to qualifying purchases for purposes of granting the statement credit and also for auditing of the effectiveness of a statement credit advertised incentive program. A qualifying purchase is a purchase that meets the requirements of an advertised incentive.

The Account Holder 102 creates a statement credit request registering for an statement credit advertised incentive on a Statement Credit Trigger Device 104. A Statement Credit Trigger Device 104 may be a computing device (e.g., a special purpose computer) such as a server, a mainframe computer, a mobile telephone, a personal digital assistant, a personal computer, a laptop, an email enabled device, or a web enabled device having one or more processors (e.g., a Central Processing Unit, a Graphical Processing Unit, or a microprocessor), which permits the Account Holder 102 to interact, e.g., with the merchant or other entity web sit displaying the statement credit trigger, and to, e.g., in some cases provide registration information.

Registration, if conducted, requires, e.g., the Account Holder to provide the name of the Account Holder 102 name, an identifier for the account of the Account Holder 102 (e.g.; a debit card, prepaid card or credit card number), and acceptance of the terms and conditions associated with the advertised incentive, such as a statement credit advertised incentive. Alternately, the Merchant 100 may create a statement credit trigger on behalf of the Account Holder 102 specifically or account holders in general, using the Statement Credit Trigger Device 104, e.g., by communicating the statement credit trigger to a Transaction Handler 108. In this case, no action is required by the Account Holder 102 for registration.

A Transaction Handler 108, or agent thereof, has access to a Statement Credit Trigger Database 110, a Transaction Database 112, a Matching Engine 114, and a Statement Credit Processor 116. The Statement Credit Trigger Database 110 receives and stores the information defining a qualifying purchase as contained in a statement credit trigger from the Statement Credit Trigger Device 104. It will be understood that this receipt and storage may occur at the time the Merchant initiates and activates the statement credit advertised incentive trigger or a the time an Account Holder 102 clicks on the Merchant 100 or other advertisement site advertisement for the advertised incentive or simply clicks onto the web site of the Merchant 100.

The Transaction Database 112 contains financial transactions for the Account Holder 102 processed by the Transaction Handler 108. The Matching Engine 114 queries the Statement Credit Trigger Database 110 and the Transaction Database 112 to match a qualifying purchase transaction with the requirements contained in a statement credit trigger. A qualifying purchase is a purchase that satisfies all the requirements of the advertised incentive as configured by the Merchant 100 and included in the statement credit advertised incentive trigger. For example, an advertised incentive may require a purchase to be made on a particular card, for a particular product, and during a particular time, or other additional requirements, such as at a particular merchant location.

When the Matching Engine 114 matches a statement credit trigger set of requirements with a qualifying purchase, the Matching Engine 114 notifies the Statement Credit Processor 116. Upon notification, the Statement Credit Processor 116 initiates a statement credit transaction between the Merchant 100 and the Account Holder 102 where funds are transferred from the Merchant 100 to the Account Holder 102 in the amount of the statement credit, which could also take place in the course of authorization by the Transaction Handler 108 of the payment from the account of the Account Holder 102 for the qualifying transaction and the crediting of the account of the Merchant 100 of the payment for the qualifying transaction.

To facilitate the statement credit transaction, the Statement Credit Processor 116 can credit the account of the Account Holder 102 with the amount of the statement credit. This transaction can then appear on the account statement for the account of the Account Holder 102 as a credit, which is equivalent to a payment and thereby offsets any amount owed on the account up to the amount of the credit. In addition, the Statement Credit Processor 116 collects the amount of the statement credit from the Merchant 100 or some other responsible entity, e.g. a supplier of the Merchant when, e.g., the supplier is sponsoring and paying for the statement credit advertised incentive program alone or together with the Merchant 100.

Figure 2:
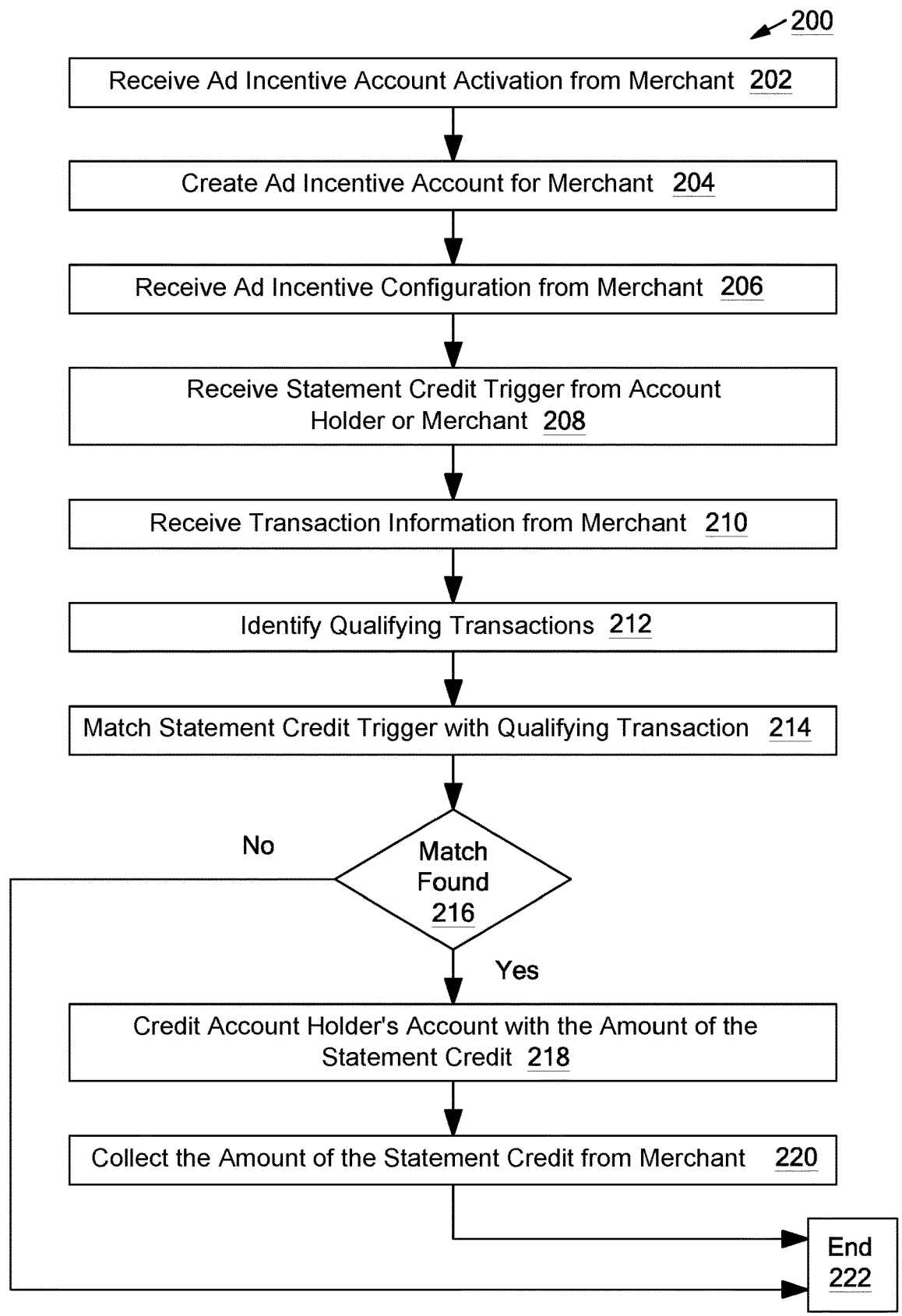
FIG. 2 is a flowchart illustrating an exemplary process for collecting and processing statement credits.

Turning to FIG. 2, a flowchart illustrates an exemplary process 200 for offering and processing statement credits. Advertised incentive account activation information is received from the Merchant, or an agent thereof, in operation 202. Once the advertised incentive account activation information is received, an advertised incentive account is created for the Merchant in operation 204. In one implementation, real time access to and manipulation of, the advertised incentive account by the Merchant 100 allows for a Merchant 100 to define any number of custom advertised incentives, such as statement credit incentives, based on any criteria a Merchant 100 desires. In addition, such real time access and manipulation allows for Merchants 100 to instantly activate or deactivate any particular advertised incentive. Once an advertised incentive is deactivated, Account Holders 102 will no longer be offered the corresponding credit statement and indications of qualifying transaction purchases for otherwise qualifying transactions will no longer be identified by the Matching Engine 114 for that particular advertised incentive.

Once the advertised incentive account is created for the Merchant 100 in operation 204, advertised incentive configuration information is received from the Merchant in operation 206. The configuration information is used to define one or more advertised incentives, such as statement credit advertised incentives, and may include the amount of the statement credit, the terms and conditions, the requirements for a qualifying purchase, and an advertisement image. In addition, the configuration information can be used to instantly activate or deactivate an advertised incentive or change other details of an advertised incentive, including changes in the terms and conditions, the amount of the statement credit, the requirements for a qualifying purchase, and the advertisement image. In one implementation, each advertised incentive will be assigned a globally unique identifier that enables the advertised incentive to be uniquely identified during subsequent processing. The combination of operations 202-206 comprises the creation and activation of a statement credit advertisement incentive program.

A statement credit trigger is received from an account holder or merchant in operation 208. The statement credit trigger is created, in one embodiment, when an account holder registers for an advertised incentive. The Account Holder 102 can register for an advertised incentive using a computer, a mobile phone, or other web enabled device. Alternately, the Merchant 100 can register the Account Holder 102 for an advertised incentive on behalf of the Account Holder 102. In one implementation, the statement credit trigger received from the Account Holder 102 or Merchant 100 in operation 208 contains an acknowledgement of the terms and conditions for the advertised incentive, the name of the Account Holder 102, the account number, and a globally unique identifier for the advertised incentive, such as the statement credit.

In one implementation, a single statement credit trigger may be associated with multiple advertised incentives for a particular Merchant 100. Responding to a statement credit trigger by registering for one advertised incentive would, therefore, qualify an Account Holder 102 for all the other advertised incentives associated with the statement credit trigger. Alternately, in another implementation, an advertised incentive trigger, such as a statement credit trigger, may be associated with a single advertised incentive, i.e., a single statement credit program.

Transaction information is received from the Merchant 100 in operation 210. The Transaction information represents information concerning a financial transaction, such as one between the Merchant 100 and the Account Holder 102.

Qualifying transactions are identified in operation 212. Qualifying transactions are those that meet the requirements of a particular advertised incentive, e.g., as identified in a statement credit trigger. For example, a given advertised incentive, such as a statement credit, may only relate to a particular product, purchased on a particular date, within a particular time after the creation of the statement credit trigger for the given advertised incentive, e.g., a statement credit. Only a purchase that meet all the requirements, as defined by the Merchant 100, e.g., in the advertised incentive statement credit trigger, for an advertised incentive is deemed a qualifying purchase transaction.

The requirements identified in a statement credit trigger are matched with a transaction to identify a qualifying transaction in operation 214. To satisfy a match, the requirements in the statement credit trigger for a given statement credit advertised incentive must match the pertinent factors regarding the qualifying transaction for the given advertised incentive. In one implementation, a match requires that an account number associated with the statement credit trigger match the account number used to make the qualifying purchase, e.g., where the advertised incentive is personal to a given Account Holder 102, such as one clicking on the advertised incentive statement credit trigger on the web site of the Merchant 100, like a display of the advertisement.

If the requirements in a statement credit trigger and a purchase for a given advertised incentive do not match (operation 216), i.e., there is not a qualifying purchase, no further action is taken and the process flow ends at operation 222. However, if the requirements in a statement credit trigger and a purchase transaction for a given advertised incentive do match (operation 216), then the account of the Account Holder 102 is credited with the amount of the statement credit at operation 218, where the advertised incentive is a statement credit. The statement credit is equivalent to a payment and, to the extent of the statement credit amount, offsets any amount owed by the Account Holder 102. In addition, the amount of the statement credit is collected from the merchant or other responsible entity, or both, in operation 220. Operations 218 and 220 can be viewed as a second transaction, in addition to the initial transaction of the purchase of goods or services by the Account Holder 102 from the merchant 100, constituting a qualifying purchase. In this second transaction, the Merchant 100 is charged for all or a portion of the amount of the initial qualifying transaction according to the amount of the agreed upon statement credit.

In another implementation, advertised incentive, such as the amount of the statement credit can be collected from a third party instead of the merchant. For example, the third party may be the manufacturer of the product that is the target of the advertised incentive. In this implementation, the merchant, or agent thereof, configures the timing, placement, appearance, and duration of the advertised incentive, i.e., after the advertised incentive trigger, according to the responsible third party's specifications, and the responsible third party funds or partly funds the advertised incentive, such as the statement credit, for deposit into the account of the Account Holder who made the qualifying purchase of the manufacture's product from the Merchant 100.

In yet another implementation, the amount of the statement credit can be collected from the Merchant 100 and/or any number of third parties. In this implementation, the Merchant 100 and/or any number of manufacturers, distributors, or other parties with an interest in selling the particular product that is the target of the advertised incentive, can fund or partially fund the statement credit.

Once the amount of the statement credit has been collected from the account of the Merchant, or other responsible party, no further action is taken and the process flow ends at operation 222.

Figure 3A:
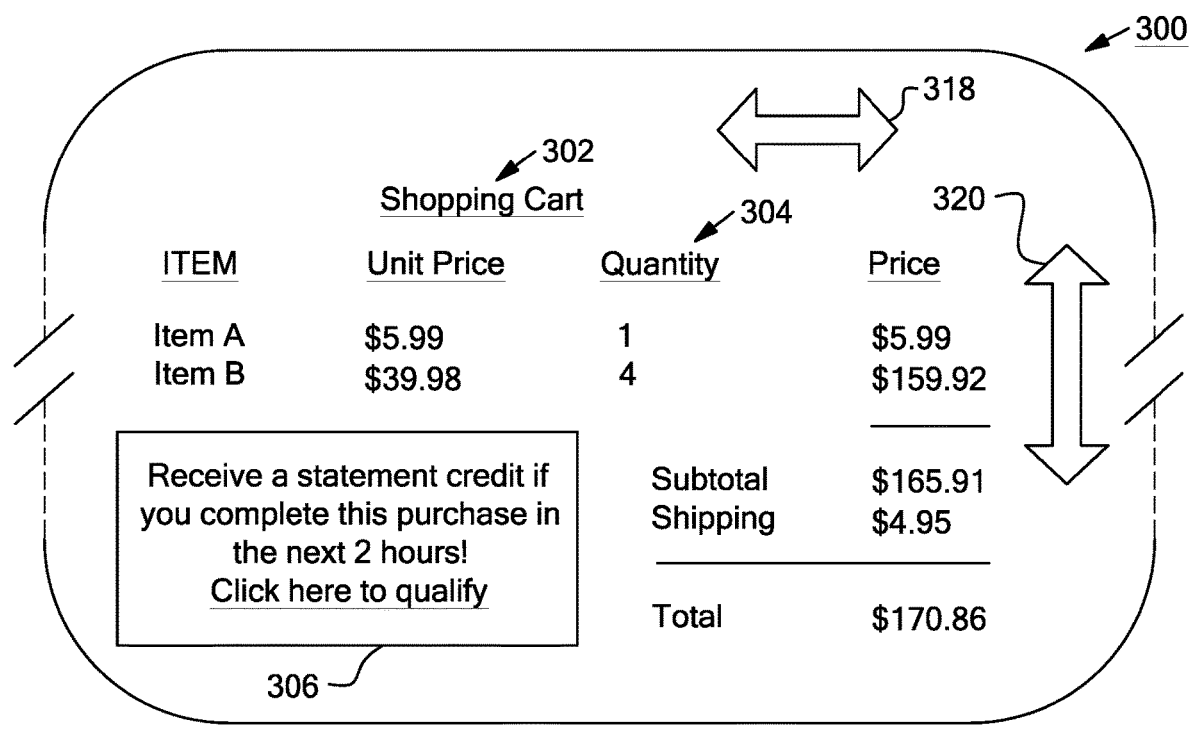
FIGS. 3(a) and 3(b) are respective exploded views of display screens featuring exemplary screen shots for rending on one or more display devices incident to a triggering of a statement credit event.

By way of example, FIG. 3(a) depicts a partial view of a Display Screen 300 or a pop-up generated thereon. Display Screen 300 features a screenshot as viewed by an Account Holder 102, and may be displayed as all or part of any advertisement publisher web site, as discussed above. Using Display Screen 300, a Merchant 100 can present an advertised incentive trigger to an Account Holder 102 and the Account Holder can register for the advertised incentive, such as a statement credit, or otherwise initiate pursuit of the advertised incentive by becoming identified with an advertised incentive, such as a statement credit, or simply become informed of the existence of the particular advertised incentive. Information relating to a statement credit trigger is communicated to the Account Holder 102 and also perhaps to a transaction handler at the time of such registration or other activation by the Account Handler of the pursuit of the advertised incentive.

The contents of Display Screen 300 contain an example Shopping Cart 302 for an online retailer. The Shopping Cart 302 contains an Inventory 304 of the contents of the Shopping Cart 302, including the item name, the unit price, the quantity, the total price, the subtotal, the shipping cost and the total cost. The Shopping Cart 302 also contains an Advertised Incentive Banner 306.

In one implementation, the Shopping Cart 302 is provided by the web server of the Merchant 100 while the contents of the Advertised Incentive Banner 306 is provided by the web server of the Transaction Handler 108, based on information received from the Merchant 100 identifying the advertised incentive requirements, such as the requirements for a statement credit incentive. The code that renders the Shopping Cart 302 includes a script that sends the globally unique identifier for the advertised incentive to the web server of the Transaction Handler 108 and reserves an area on the Shopping Cart 302 for the Advertised Incentive Banner 306. The web server of the Transaction Handler 108 provides content directly to the reserved area of the Shopping Cart 302 (i.e., the Advertised Incentive Banner 306).

In another implementation, an advertised incentive image provided by the merchant may also be included in the Advertised Incentive Banner 306. The advertised incentive image is provided as part of the advertised incentive configuration. When an advertised incentive is requested, e.g., by the Account Holder clicking on the advertised Incentive Banner 306 script on Shopping Cart 302, the web server of the transaction handler 108 may send text, an image, or a combination of both to populate the content of the Advertised Incentive banner 306.

In the present implementation, illustrated by way of example in FIG. 3(a), the Advertised Incentive Banner 306 is intended to incentivize the Account Holder 102 to complete the purchase of the items already added to the Shopping Cart 302 within some selected period of time, such as two hours, as noted in FIG. 3(a). In another implementation, the Merchant 100 may configure the Advertised Incentive Banner 306 to incentivize the Account Holder 102 to add an item to the Shopping Cart 302. For example, if the Merchant desires to incentivize a specific product, an Advertised Incentive Banner 306 may be configured to appear on the page illustrated in FIG. 3(a) or alternatively on an information page for that product. Such placement will incentivize the Account Holder 102 to add the product to the Shopping Cart 302. In yet another implementation, the Merchant may place multiple Advertised Incentive Banners 306 at various locations on the web site of the Merchant 100 to simultaneously provide different types of incentives. In such an implementation, each advertised incentive may be independently configured.

The Merchant 100 may disable an advertised incentive at any time by changing the configuration for the advertised incentive contained in the advertised incentive account created with the advertised incentive trigger. In one implementation, the Merchant 100 may provide alternate content for the advertised incentive when the advertised incentive is disabled. In this implementation, the Advertised Incentive Banner 306 will display an advertised banner when the advertised incentive is enabled, but show different content, such as an informational banner, when the advertised incentive is disabled. In such an embodiment, no changes need to be made to the website of the Merchant 100 to activate or deactivate the advertised incentive. Therefore, advertised incentives can be easily and instantly enabled or disabled using the advertised incentive account with or without modification to the web site of the Merchant. Alternatively, where the advertised incentive, such as the statement credit, is defined through an advertised incentive trigger created by the Merchant 100 on the web site of the Merchant 100 the incentive can be disabled by the Merchant 100 on the web site of the Merchant 100, e.g., by removing the Advertised Incentive Banner 306.

To register for the advertised incentive, the Account Holder begins by activating the Advertised Incentive Banner 306. Activation can be accomplished by clicking (i.e. using a mouse on a standard computer), by touching (i.e. using the screen on a touch enabled computing device), or otherwise selecting the Advertised Incentive Banner 306. Upon activation of the Advertised Incentive Banner 306, a request is sent to the web server of the Transaction Handler 108 for a statement credit registration Form. Horizontal and vertical icons 318, 320 can be activated by a user to scroll the image on the display screen, respectively, horizontally and vertically.

Figure 3B:
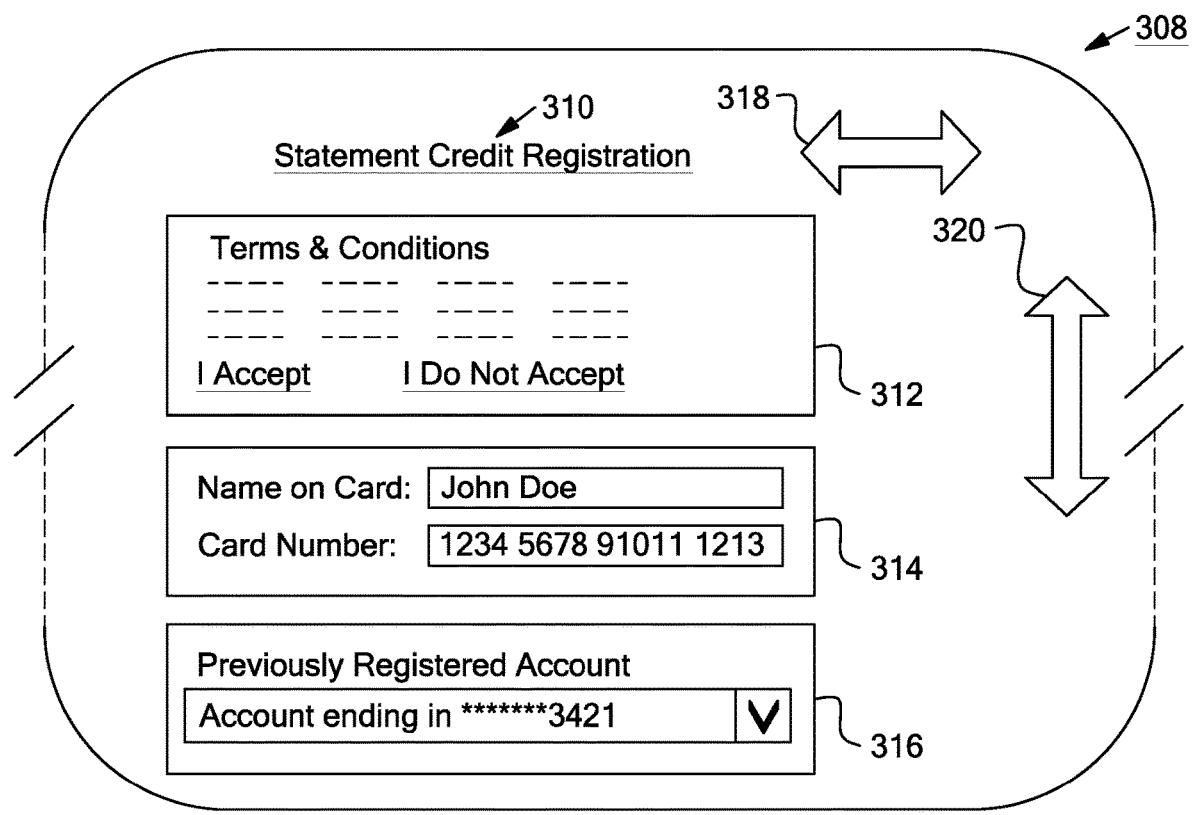

By way of example, FIG. 3(b) depicts a portion of a Display Screen 308. The Display Screen 308 features a screenshot, as viewed by an Account Holder 102, of a Statement Credit Registration Form 310. The Statement Credit Registration Form 310 is hosted by the web server of the Transaction Handler 108 and may be a full web page, a separate pop-up page, or embedded content in an existing page. The Statement Credit Registration Form 310 contains terms and conditions 312, which were provided by the merchant upon configuration of the advertised incentive. In addition, the Statement Credit Registration Form 310 contains an Account Information Section 314.

Registration is complete when the Account Holder accepts the Terms and Conditions 312 and provides a name and account number in the Account Information Section 314. The registration information, along with the globally unique identifier for the advertised incentive, is submitted to the Transaction Handler 108 and a statement credit trigger has been created according to this embodiment.

In one implementation, a cookie is stored on the web browser of the Account Holder by the web server of the Transaction Handler 108. The cookie contains a globally unique identifier that identifies the registration information for a single account holder. Multiple cookies may be stored on a web browser if multiple Account Holders use the same computer or if the Account Holder registers for more than one advertised incentive program, such as multiple statement credit incentive programs. Upon the display of the Statement Credit Registration Form 310 by the web server of the Transaction Handler, previously provided registration information stored on the web server of the Transaction Handler can be referenced by a cookie. When such a cookie is present, the Account Holder 102 may be presented with the option to register in Statement Credit Registration Form 310 by selecting an item from the Previously Registered Section 316. The registration information listed in Previously Registered Section 316 is populated by the web server of the Transaction Handler 108 based on a globally unique registration information identifier stored in the cookie.

Storing and referencing registration information by cookies allows for an Account Holder to easily register for an advertised incentive. Instead of providing any information, the Account Holder 102 merely needs to select the appropriate account that had already been registered for the same or different advertised incentive. In addition, this method is secure because the cookie only stores the globally unique identifier for an Account Holder 102. The sensitive registration information is stored on the web server of the Transaction Handler 108 only. However, the globally unique identifier allows the web server of the Transaction Handler 108 to associate a cookie with a particular Account Holder 102 and recall the previously provided registration information for the Account Holder 102.

In another implementation, the merchant may register the account holder's eligibility for an advertised incentive on behalf of the account holder. This implementation would be most appropriate for merchants who have an identifier for the account holder's account (e.g.; card on file) because the merchant would have all the information necessary to register the account holder for the advertised incentive. In this implementation, the merchant may choose to provide the content for the advertised incentive banner instead of relying on the transaction handler to provide the content. In yet another implementation, the merchant may wish to automatically give incentives in the form of statement credits to certain highly valued customers, regardless of what the customer may purchase, as a general incentive for the highly valued customer to continue to patronize the merchant's web site.

In yet another implementation, the same method described above may be used with a brick and mortar store in addition to a web-based store. An account holder may register for an advertised incentive before visiting a brick and mortar store or at the store itself. As long as the account holder registers for the advertised incentive before making a qualifying purchase, the account holder may use a terminal provided by the store, a wireless handheld device, or any other Internet connected device to register for an advertised incentive.

In still another implementation, a merchant may host, or have hosted, a web site at a web service in order to sell its advertised goods and service. The web service, which may include one or more web servers, receives advertised incentive configuration information from the merchant, such as by the merchant operating a client to access the web service. A unique identifier is assigned by the web service to the advertised incentive configuration information. Thereafter, the web service receives a request from a client to be served a web page that includes an advertised incentive based on the unique identifier. In this case, the advertised incentive is a statement credit that is being offered to a user operating the client.

The web service serves the requested web page to the client who is accessing the merchant's web site using a browser executing on the client. The web page served to the client by the web service will include the advertised incentive which advertises the statement credit. In response to the served web page that included the advertised incentive, there is received at the web service from the client, a statement credit trigger. The statement credit trigger may be received in response to the user of the client 'clicking' on a displayed icon corresponding to the advertised incentive based on the unique identifier. Here, the user's "click" is intended as an act to purchase a corresponding good or service from the Merchant 100 for which the merchant 100 is offering, via the advertised incentive, a statement credit to the user if the user conducts a transaction for the purchase on an account issued by an issuer 404 to the user. Thereafter, transaction data is received from the Merchant 100, where the transaction data may include a plurality of transaction between the Merchant 100 and one or more consumers.

When the transaction data has been determined, using predetermined criteria, to include a qualifying transaction conducted on the account issued by the issuer 404 to the user, and when a predetermined dataset in the statement credit trigger matches a predetermined dataset in the qualifying transaction, a transmission is sent for delivery to the issuer 404 of the account of the user. The transmission will include a financial message giving instructions to credit to the account of the user for an amount corresponding to the statement credit trigger. A corresponding transmission will be sent for delivery to an issuer 404 of an account issued by an issuer 404 to a sponsor of the statement credit trigger, where the corresponding transmission will include a financial message giving instructions to debit the sponsor's account for the amount of the statement credit trigger. As such, the user's account is credited for the statement credit as advertised on the web page, and the sponsor of the statement credit has its account debited for the amount of the user's statement credit.

In the foregoing implementation, at any time, the merchant, the sponsor, or agents thereof, can, in real time, revoke the statement credit offer on the web page so that no other user can take advantage of the statement credit offer. For instance, when the merchant depletes inventory of a good or service for which a statement credit is being advertised on the merchant's web site, the merchant can use a client to communicate with the web service to update the web page to remove the statement credit from the web page. Note also that the sponsor can be, a manufacturer, a supplier, a distributor, and a combination of the foregoing.

Figure 4:
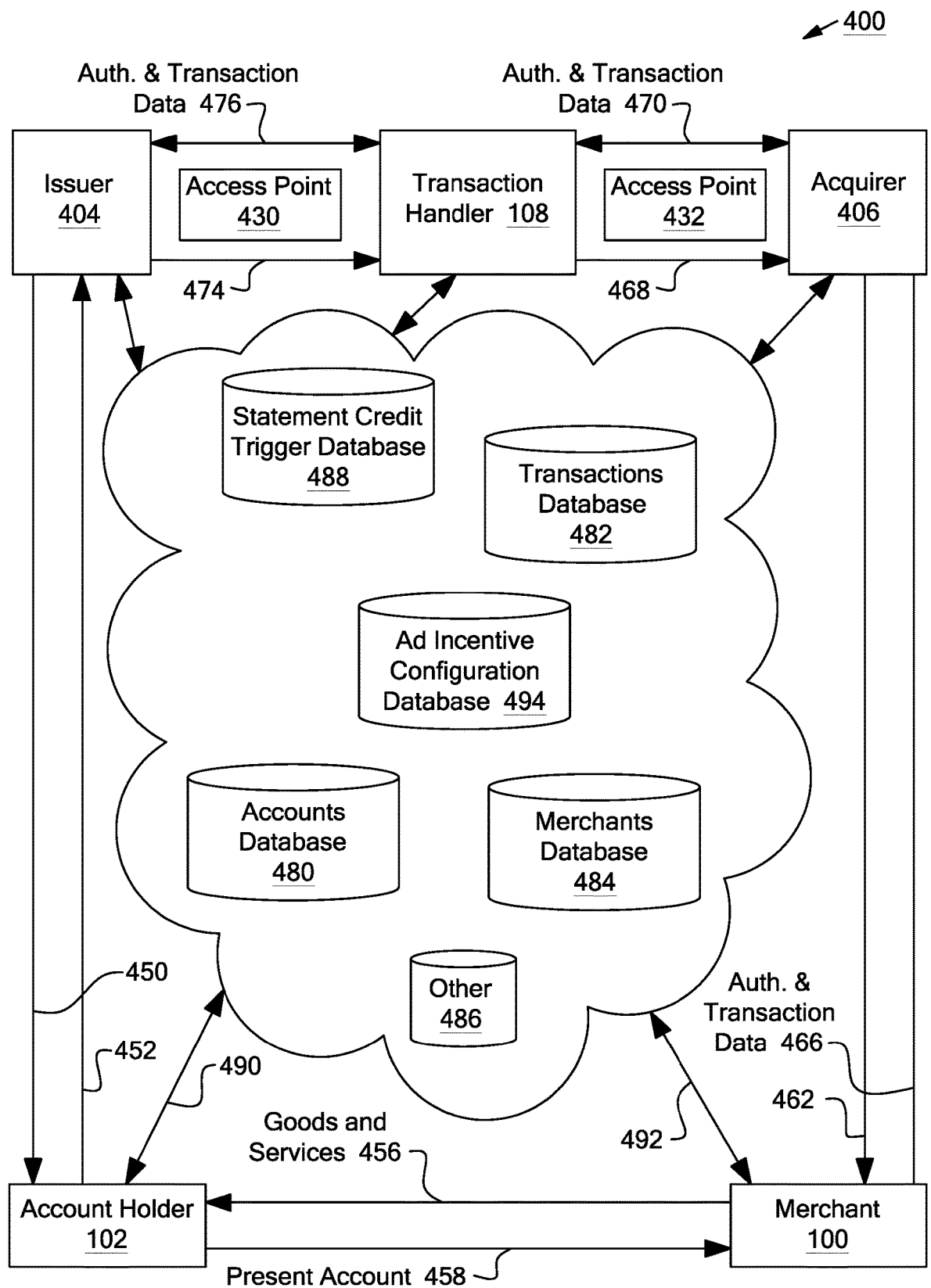
FIG. 4 illustrates an exemplary payments processing system for processing transactions conducted with merchants by account holders thereof, wherein, for each transaction, there is a provision of a service or good by a merchant to an account holder for the transaction on an account of the account holder, there is an authorizing and remunerating of an electronic payment by the account holder in conducting the transaction on the account with the merchant, and there is a authorizing and remunerating of an electronic payment by the merchant, or other responsible party, in fulfilling a statement credit to the account holder.

Referring to FIG. 4, an Account Holder 102 conducts a financial transaction with a Merchant 100. By way of example, the financial transaction with the Merchant 100 may have been incentivized by a statement credit defined by the Merchant 100 through an advertised incentive. The diagram of FIG. 4 depicts an exemplary process 400 of a particular financial transaction system.

Account Holder 102 presents an electronic payment device (i.e.; a credit card) to a Merchant 100, as indicated by arrow 458, as tender for a financial transaction such as a purchase of goods. Those of skill in the art will recognize that other financial transactions and instruments other than credit cards may also be used, including, but not limited to, a credit card, debit card, prepaid card, cellular telephone, Personal Digital Assistant (PDA), etc. For purposes of illustration and explanation, however, reference will be made to a credit card.

As part of the transaction, the payment device of the Account Holder 102 can be a The payment device is read by a reader operated by the Merchant 100, whereupon account information is read from the payment device and a request for authorization is transmitted to the an Acquirer 406 for the Merchant 100, as indicated by arrow 466. Each Acquirer 406 is a financial organization that processes credit card transactions for businesses, for example the Merchant 100, and can be licensed as a member of a transaction handler 108 such as a credit card association (i.e., Visa Inc.®, MasterCard®, etc.) As such, each Acquirer 406 establishes a financial relationship with one or more merchants such as Merchant 100.

The Acquirer 406 transmits the account information to the Transaction Handler 108, as indicated by arrow 470, and the Transaction Handler 108 in turn routes the request to the Issuer 404 of the Account Holder 102, such as an issuing bank, as indicated by arrow 476. The Issuer 404 returns authorization information to the Transaction Handler 109, as indicated by arrow 474, who returns the information to the Merchant 100 through the Acquirer 406, as indicated by arrows 468 and 462. The Merchant 100 now knowing whether the credit card account of the Account Holder 102 is valid and supports a sufficient credit balance, may complete the transaction and the Account Holder 102 in turn receives goods and/or services in exchange, as indicated by arrow 456. Most credit card associations instruct merchants that, after receiving authorization, the detailed credit card account information obtained from the point of sale magnetic stripe scanner must be deleted.

To reconcile the financial transactions and provide for remuneration, information about the transaction is provided by the Merchant 100 to the Acquirer 406, as indicated by arrow 466, who in turn routes the transaction data to the Transaction Handler 108, as indicated by arrow 470 who then provides the transaction data to the appropriate Issuer 404, as indicated by arrow 476). The Issuer 404 then provides funding for the transaction to the Transaction Handler 108, as indicated by arrow 474, e.g., through a settlement bank (not shown). The funds are then forwarded to the Merchant's 100 Acquirer 406, as indicated by arrow 468, who in turn credits the account of the Merchant 100 for the transaction conducted, as indicated by arrow 462, e.g., less a transaction handler/acquirer discount, if applicable. The Issuer 404, then bills the Account Holder 102, as indicated by arrow 450), and the Account Holder 102 pays the Issuer 404, as indicated by arrow 452, with possible interest or fees.

Each of the Issuer 404, Merchant 100, Acquirer 406 and the Transaction Handler 108 may have access to information resources having one or more of the following databases: transaction database 482, merchant database 484, accounts database 480, Statement Credit Trigger Database 488, Advertised Incentive Configuration Database 494, and/or other database 486, some or all of which may be combined in functionality with others of the group of databases just mentioned, or some subset(s) of such group, or be divided into one or more databases performing the same functionality separately or cooperatively. Some or all of these databases, or subsets thereof, can be connected by a network, Internet, virtual private network, LAN, WAN or by other means known to those skilled in the art. Moreover, not every participant must necessarily have access to any or all of the databases. Each database can assign read, write, and query permissions as appropriate to the various participants. For example, a Merchant 100 may have read access to the accounts database 480 and the Issuer or Transaction Handler 108 may have read and write access.

The transaction database 482 is designed to store some or all of the transaction data originating at the Merchant 100 that used a payment device for each transaction conducted between an Account Holder 102 and the Merchant 100. The transaction data can include information associated with the consumer payment device account of an Account Holder 102, such as, date, time, and location among other more specific information including the amount of the transaction. The transaction database can be searched using account information, date and time (or within proximity thereof), or by any other field stored in the database.

The Advertised Incentive Configuration Database 494 is designed to store configuration information provided by the Merchant 100 for advertised incentives. For example, whether the advertised incentive is enabled or disabled on the web site of the Merchant 100, or on some other advertisement publishing site or the site of the Transaction Handler 108 and/or Issuer 404, the valid time period for the advertised incentive, the type of incentive, e.g., including a statement credit, and if so the amount or percentage of the credit, and other requirements for a qualifying purchase, such as the product or service to be purchased, the type of payment, including the use of a particular consumer payment device associated with the Issuer 404 and/or the Transaction Handler 108, the location of the purchase, including on-line or from a consumer mobile communication device, etc. and text and graphics to be displayed on the advertised incentive banner, are stored in this database. It will be understood that in one embodiment when the Merchant has selected some or all of these requirements included within the Configuration Information, and indicates the incentive is to be in place, or activates the banner displaying the advertised incentive, or otherwise "turns on" the advertised incentive, the Merchant has created and set in place an advertised incentive trigger. Also, when the Merchant 100 chooses to turn off the advertised incentive, i.e., make it no longer active and subject to being executed by a consumer, and thus earning the incentive, the Merchant "turns off" i.e., deactivates the trigger.

The Statement Credit Trigger Database 488 is designed to store registration information for advertised incentives, which may include some portions or all of the above noted contents for the Advertised Incentives Database 94, and the two may also be combined. A statement credit trigger, in one embodiment may be created in the Statement Credit Trigger Database 488 when an Account Holder 102 is directly or indirectly registered with an advertised incentive. An Account Holder 102 can directly register with an advertised incentive by providing the registration information, as indicated by arrow 490. Alternately, a Merchant 100 can indirectly register the Account Holder 102, as indicated by arrow 492, with an advertised incentive by providing the registration information on behalf of the Account Holder. As noted above, for an Account Holder 102 to qualify for an advertised incentive, such as a statement credit, the statement credit trigger must be created before a qualified purchase is made and not have been "turned off" by the Merchant 100. That is, in one embodiment, where the Merchant 100, the Transaction Handler 108 and/or the Issuer 404 decide that registration by the Account Holder 102 for the creation of n advertised incentive trigger, then entries into the Statement Credit Trigger Database 488 may not be required for a trigger, and the information put into the advertisement Incentive Configuration Database 494 may be all that is required to establish an advertised incentive trigger. Similarly, all of this data may be incorporated into a combined Statement credit Trigger Database and Advertised Incentive configuration database for purposes of retaining information needed to create an advertised incentive trigger and define how the system responds to an Account Holder 102 qualifying for the defined advertised incentive when the trigger is activated.

The Merchant Database 484 is designed to store information about each Merchant 100. The Merchant Database 484 can contain information such as the unique identification of each Merchant 100, an identifier for each point of sale device in use by the Merchant 100, and location(s) of the Merchant 100.

The Accounts Database 480 is designed to store account information for payment devices associated with an Accounts Holder 102. The Accounts Database 480 can store part or all of an account number, unique encryption key, account information, account name, globally unique identifier for the Account Holder 102 and/or the consumer payment device account(s) of the Account Holder 102. The information from the Accounts Database 480 can be associated with information from the Transactions Database 482.

After registering for an advertised incentive, when such is required, an Account Holder 102 initiates a qualifying purchase transaction with a Merchant 100 by presenting a consumer payment device, as indicated by arrow 458 to the Merchant 100. The consumer payment device is typically presented at a Point Of Sale/Service ("POS") terminal (not shown in FIG. 4) at which data thereon is read. Certain transaction information is transmitted from the POS terminal in route to the Merchant's (n) 410 Acquirer (i) 406. The transaction information can include account information, account name, transaction balance, transaction time, transaction date, and transaction location, product/service identifier, merchant/POS identifier, etc. Sensitive information includes information such as account number and account holder name that identify and associate a particular account with a particular account holder. This transaction information may be transmitted via a less secure communication medium. In addition, a transmission of transaction data may occur with weak or no encryption between two or more points from the point of origin, such as the point of sale device at the Merchant 100, and the ultimate destination, such as the Acquirer 406.

These points can include, without limitation, from the reader at the POS, the POS terminal at the Merchant 100 and a network router or computer that is connected to a network but is housed and maintained by the Merchant 100 and between the Merchant 100 and the Acquirer 406. The communication channel could be Ethernet, wireless internet, satellite, microwave transmission, infrared transmission, or other known communication protocols. Some or all of the transmission may also be stored for record keeping, archival or data mining purposes with little or no encryption, e.g., in one or more of the above noted databases or combinations of those databases. For example, the Merchant 100 may store transaction data, including certain account information in, e.g., an accounts on file database (not shown) of the Merchant's 100, for reuse later.

In this process, transaction information relating to the qualifying purchase transaction is retrieved from the POS at a Merchant 106 or from some other computing device and/or related database at the Merchant 100. The transaction information is comprised of account information together with other information about the transaction itself: time, date, location, value, product/service, type of payment, etc. Certain of the transaction information is considered sensitive information including, without limitation, account number, credit card verification number, and account name.

Upon completion of the qualifying purchase transaction, transaction information relating to the advertised incentive, such as the statement credit, is used to initiate a second transaction that largely mimics the path of the qualifying purchase transaction except in the opposite direction. Thus, the statement credit is a transfer of funds from the Merchant 100 and/or another responsible entity, to the Account Holder 102, or a pseudo transfer wherein the amount is simply credited against the outstanding balance in the account of the Account Holder 102.

FIG. 4 further illustrates a payment processing network that may make use of any suitable telecommunications network and may involve different hardware, different software and/or different protocols then those discussed below. FIG. 4 is a global telecommunications network that supports purchase and cash transactions using any bankcard, travel and entertainment cards, and other private label and proprietary cards. The network also supports ATM transactions for other networks, transactions using paper checks, transactions using smart cards and transactions using other financial instruments.

These transactions are processed through the payment processing network's authorization, clearing and settlement services. Authorization is when an issuer approves or declines a sales transaction before a purchase is finalized or cash is dispersed. Clearing is when a transaction is delivered from an acquirer to an issuer for posting to the customer's account. Settlement is the process of calculating and determining the net financial position of each member for all transactions that are cleared. The actual exchange of funds is a separate process.

Transactions can be authorized, cleared and settled as either a dual message or a single message transaction. A dual message transaction is sent twice—the first time with only information needed for an authorization decision, an again later with additional information for clearing and settlement. A single message transaction is sent once for authorization and contains clearing and settlement information as well. Typically, authorization, clearing and settlement all occur on-line.

The system/method illustrated by way of example and partially schematically in FIG. 4 can include one or more transaction handlers 108, access points 430, 432, acquirers 406, and issuers 404. Other entities such as drawee banks and third party authorizing agents may also connect to the network through an access point. An interchange center is a data processing center that may be located anywhere in the world. In one implementation, there are two in the United States and one each in the United Kingdom and in Japan. Each interchange center houses the computer systems and databases that are used to perform the consumer payment network transaction processing. The interchange center serves as the control point for the telecommunication facilities of the network, which comprise high speed leased lines or satellite connections based on IBM SNA protocol. Preferable, the communication lines that connect an interchange center (including one or more Transaction Handlers 108) to remote entities use dedicated high-bandwidth telephone circuits or satellite connections based on the IBM SNA-LUO communication protocol. Messages are sent over these lines using any suitable implementation of the ISO 8583 standard.

Access points 430, 432 are typically made up of small computer systems located at a processing center that interface between the center's host computer and the interchange center. The access point facilitates the transmission of messages and files between the host and the interchange center supporting the authorization, clearing and settlement of transactions. Telecommunication links between the Acquirer 406 and its access point, and between the access point and Issuer 404 are typically local links within a center and use a proprietary message format as preferred by the center.

A data processing center (such as is located within an Acquirer 406, Issuer 404, or other entity) houses processing systems that support merchant and business locations and maintain customer data and billing systems. Preferably, each processing center is linked to one or two interchange centers. Processors are connected to the closest interchange, and if the financial/payment network experiences interruptions, the network automatically routes transactions to a secondary interchange center. Each interchange center is also linked to all of the other interchange centers. This linking allows processing centers to communicate with each other through one or more interchange centers. Also, processing centers can access the networks of other programs through the interchange center. Further, the network ensures that all links have multiple backups. The connection from one point of the network to another is not usually a fixed link; instead, the interchange center chooses the best possible path at the time of any given transmission. Rerouting around any faulty link occurs automatically.

Figure 5:
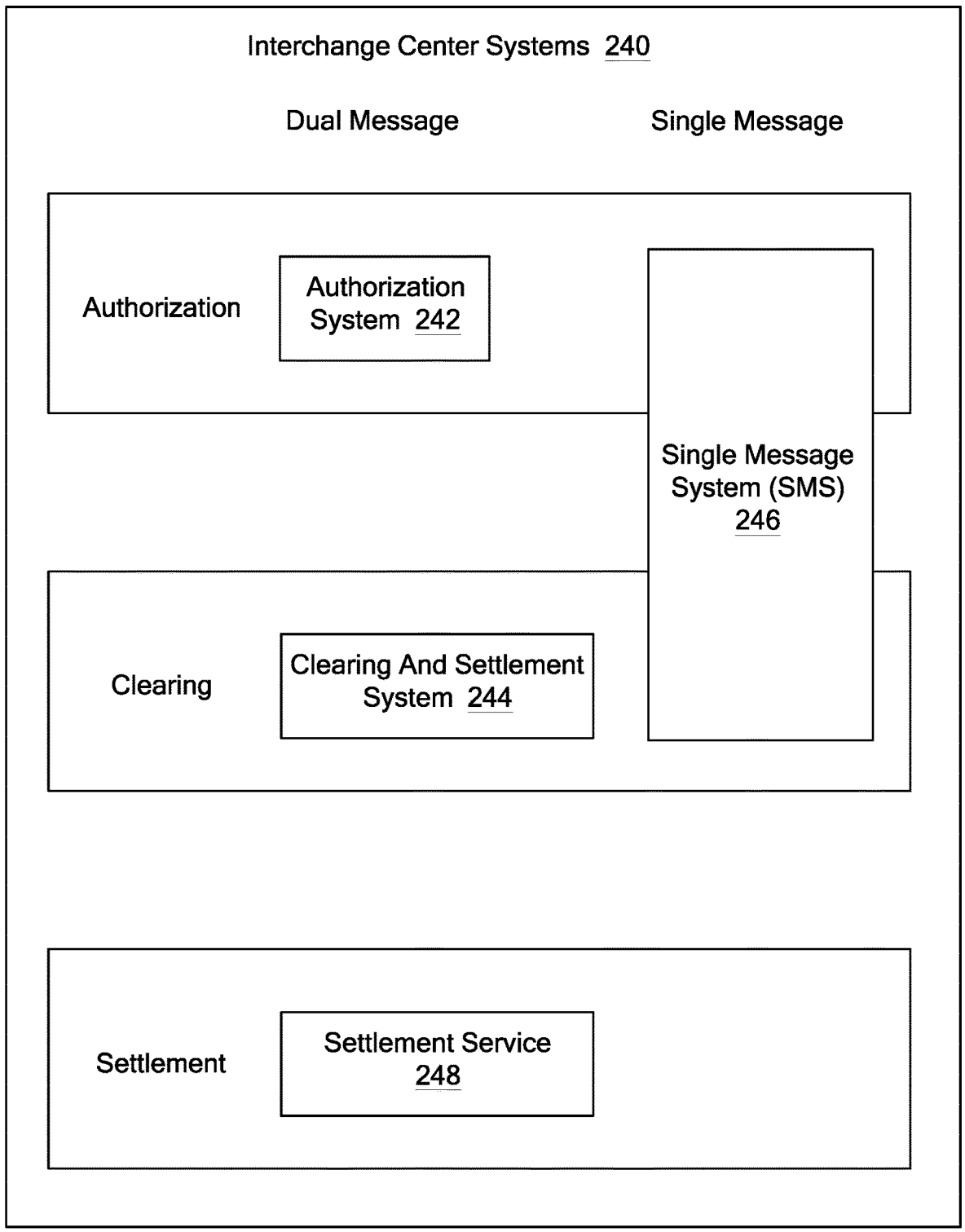
FIG. 5 illustrates systems housed within an interchange center to provide online and offline transaction processing for transactions conducted using the payments processing system of FIG. 4.

FIG. 5 illustrates an example of an interchange center system 240 housed within an interchange center (not shown) to provide on-line and off-line transaction processing. For dual message transaction, authorization system 242 provides authorization. System 242 supports on-line and off-line functions, and its files include internal system tables, a customer database and a merchant central file. The on-line functions of system 242 support dual message authorization processing. This processing involves routine cardholder and card verification and stand-in processing, and other functions such as file maintenance. Off-line functions can include reporting, billing and generating recovery bulletins. Reporting includes authorization reports, exception files and advice file reports, POS reports and billing reports. A bridge from system 242 to system 246 makes it possible for members using system 242 to communicate with members using system 246 and access the SMS gateways to outside networks.

Clearing and settlement system 244 clears and settles previously authorized dual message transactions. Operating on a global basis, system 244 collects financial and non-financial information and distributes reports between members. It also calculates fees, charges and settlement totals and produces reports to help with reconciliation. A bridge (not shown) forms an interchange between system 244 processing centers and system 248 processing centers.

Single message system 246 processes full financial transactions. System 246 can also process dual message authorization and clearing transactions, and communicates with system 242 using a bridge and accesses outside networks as required. System 246 processes Visa, Plus Interlink and other card transactions. The SMS files comprise internal system tables that control system access and processing, and the cardholder database, which contains files of cardholder data used for PIN verification and stand-in processing authorization. System 246 on-line functions perform real-time cardholder transaction processing and exception processing for authorization as well as full financial transactions. System 246 also accumulates reconciliation and settlement totals. System 246 off-line functions process settlement and funds transfer requests and provide settlement and activities reporting. Settlement service 248 consolidates the settlement functions of system 244 and 246, including Interlink, into a single service for all products and services. Clearing continues to be performed separately by system 244 and system 246.

Figure 6:
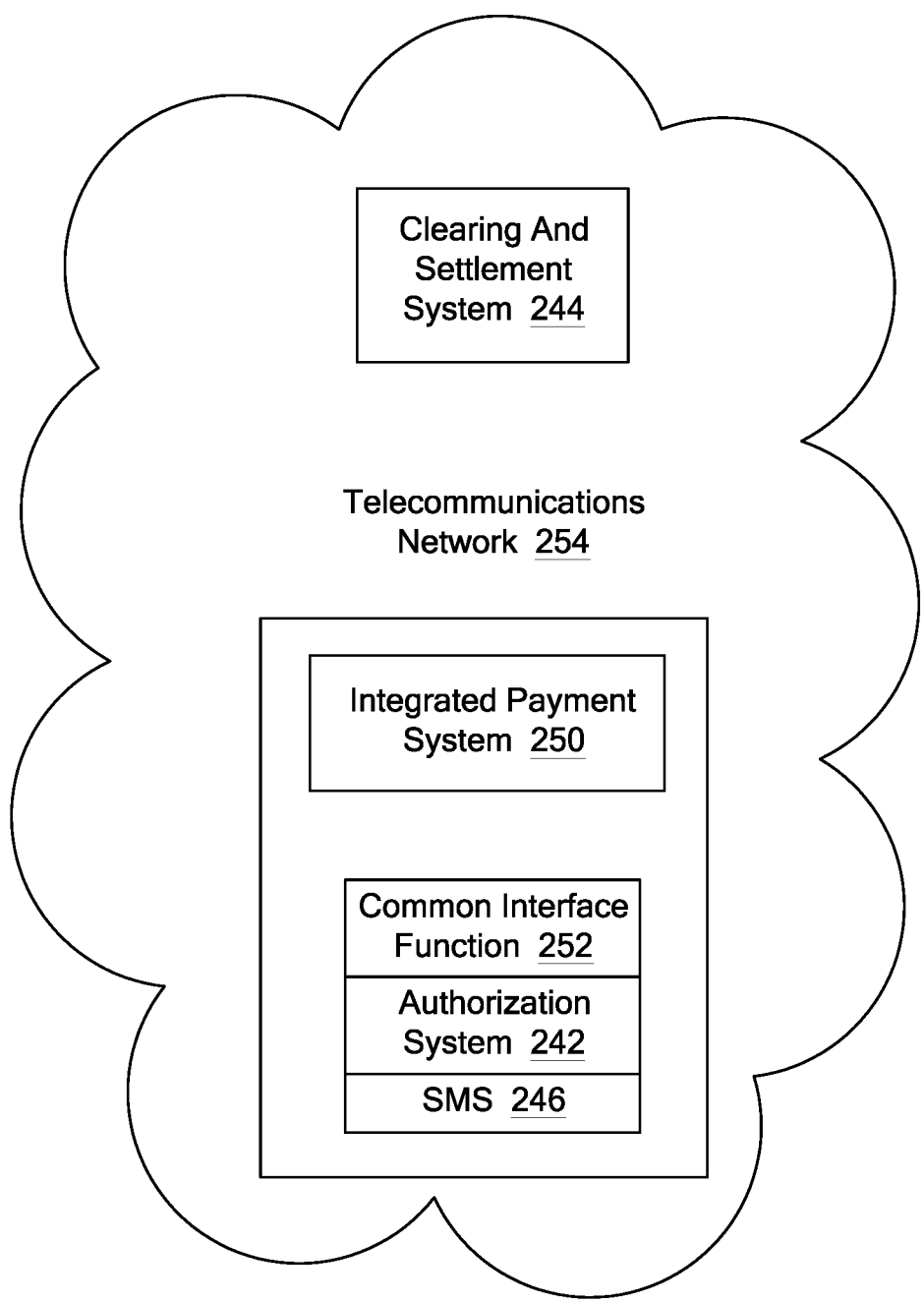
FIG. 6 illustrates another view of the components of FIG. 4.

FIG. 6 illustrates another view of components of FIG. 5 as a telecommunications network 254. Integrated payment system 250 is the primary system for processing all on-line authorization and financial request transactions. System 250 reports both dual message and single message processing. In both cases, settlement occurs separately. The three main software components are the common interface function 252, authorization system 242 and single message system 246.

Common interface function 252 determines the processing required for each message received at an interchange center. It chooses the appropriate routing, based on the source of the message (system 242, 244 or 246), the type of processing request and the processing network. This component performs initial message editing, and, when necessary, parses the message and ensures that the content complies with basic message construction rules. Common interface function 252 routes messages to their system 242 or system 246 destinations.

The VisaNet® system is an example component of the transaction handler 108 in the payment processing system 400 of FIG. 4. Presently, the VisaNet® system is operated in part by Visa Inc. As of 2007, the VisaNet® system Inc. was processing around 300 million transaction daily, on over 1 billion accounts used in over 170 countries. Financial institutions numbering over 16,000 connected through the VisaNet® system to around 30 million merchants. In 2007, around 81 billion transactions for about 4 trillion U.S. dollars were cleared and settled through the VisaNet® system, some which involved a communication length of around 24,000 miles in around two (2) seconds.

Persons skilled in the art will understand that graphic advertisements are being placed by advertisement publishers, such as, Google and other advertisement engines on any site that wishes to be an "advertisement publisher" and making huge amounts of money by doing so from this form of advertising. A issuer or a transaction handler can add a coupon to any advertisement publisher site or even onto the issuer's or transaction handler's own site(s). As such a multi-URL advertisement can be delivered as a single advertisement on any such web site/page, such as a banner advertisement or occupying unused real estate on the existing page. A user can activate the advertisement, such as by clicking on the advertisement, and, e.g., go to the "advertiser" site, or a pop-up on the present site being visited.

The single advertisement can invite the user, e.g., "Click here and get a Visa® hosted statement credit form." When a user clicks on a cookie can be left with a correlation ID, so subsequent clicks may not require the user to supply account information. The single advertisement can invite the user to, e.g., "Click here and launch Enhanced Card Services or any other Visa® service," or "Click to receive a 10% statement credit if you pay with your Visa® card."

The system/method according to embodiments of the disclosed subject matter may serve to provide a merchant a service which can provide actual metrics back to merchants, e.g., by track actual fulfillment of advertised incentive offers. No point of sale involvement by the merchant is required. No point of sale changes are required, e.g., training of check out clerks, etc. Consumers can be induced to click and pay attention to advertisements even if they don't use them. The system and method can drive payments to an issuer or transaction handler, such as Visa® from merchants and suppliers of branded products. The system and method can be utilized for all manner of account card transactions, such as card not present ("CNP"), Web transactions or portable user communication device transactions, including card on file and card not on file, transactions, but also, in addition, card present store transactions. Appropriate security measures for CNP transactions may be employed as are well known in the art.

It will also be understood by those skilled in the art that the system and method of the presently disclosed subject matter can serve to provide a merchant with a service which can enable merchants to define their own kickers and offers, i.e., advertised incentives, such as statement credit incentives. It can increase the velocity of offers made by or on behalf of a merchant and thus in turn increase the velocity of payment transactions, including qualifying transactions. The system and method can reduce the existing requirements for involvement and coordination between the merchant and the entity associated with running current offer campaigns, especially dynamically changing incentive/offer campaigns, such as statement credit campaigns, as to which the merchant may desire a good degree of dynamically executable flexibility, such as in designing and in activating and deactivating the incentive program.

It can also reduce the ongoing technology burden for merchants to update their web site for kickers and offers, such as advertised incentives. A merchant, according to one embodiment, can make a single change to their web-site, or to an advertisement already appearing on the web site or the web site of another advertisement publisher, or to an advertisement appearing on the web site of an issuer or transaction handler, such as through a portal to the web site of the transaction handler. the merchant can then manage ad hoc offers and changes to offers, such as advertised incentives, especially ones that are desired to be very dynamic in content, requirements, and time available, such as statement credit advertised incentives, without further changes to the advertisement, the merchant site or the advertisement publishing site.

An example of such a system and method may be placed on an advertising publishing site, as an example www.sci-kids.com/myorangetoasterblog. The advertisements could be banner advertisements and could be coded and placed by a merchant, the site itself or an issuer or transaction handler or advertisement publishing broker, such as Google. The publisher site could have a special page for advertisements or the advertisement may appear on a popular page on the site, such as Sci-kids.com ("Surendra's site"), or could be related to a specific topic covered by the page or being discussed on the page, such as a blog page. the topic, as an example could be "Orange Colored Toasters." Key words, metatags and the like can be on the site/page, e.g., to draw search engines, such as Google to the site, e.g., for advertisement placement, such as Try Rightcliq by Visa.

As another example of a system and method according to aspects of embodiments of the disclosed subject matter, as part of a one time activity, the issuer or transaction handler, such as Visa® can bring on a merchant, such as by having the merchant log on to a Merchant Offer Portal, e.g., on the Visa® transaction handler web site, or on the main web site of Visa®. The merchant can enter terms of an advertised incentive program, such as a statement credit program, and activate the service so the advertised incentive program appears on the merchant web site or other publishing web site with or without advertisements for the merchant, thus establishing a trigger, such as an advertised incentive, such as a statement credit, trigger. The merchant can return anytime later to the Merchant Offer Portal, and turn off the incentive program, i.e., deactivate the trigger, and e.g., the advertisement banner will disappear from the appropriate web site(s). The terms of an advertised incentive campaign can be passed to the statement credit processor 116, e.g., in daily batches.

Through the log on using the Merchant Offer Portal, details of the advertised incentive, such as a statement credit program, can be captured and stored by, e.g., the transaction handler, such as Visa®. Thus the details comprising the advertised incentive program trigger can be made available by the merchant to the transaction handler, though also subject to future modification by the merchant. The incentive program, such as the statement credit incentive program, may be subject to configuration by the merchant. such configuration may be done by the merchant through the portal, and may include defining the substance of the incentive itself, such as the amount of a statement credit, and the activation/deactivation of the incentive program, i.e., activating the trigger or deactivating the trigger. Periodically, according to an embodiment, such as each evening, a batch of statement credit activated triggers can be compared to actual transactions for which the transaction handler authorized payments during that day and qualifying purchase transactions identified by the activated triggers, and appropriate transactions as noted above made to implement the incentive, such as the statement credit. Optionally an alert can be sent to the customer of the implemented statement credit, before sending the usual account statement of the statement credit transaction.

A Merchant can pick real estate on its check out page and make a one time change to the merchant's system. It can be on the check out page or any other page which will help encourage a sale. When the merchant isn't using the advertised incentive service, the space is blank or contains a simple message unrelated to advertised incentives. When the merchant has the service turned on, i.e., the advertised incentive trigger is activated, the merchant has the ability to create/modify the message and the terms, and the transaction processor powers the back end.

The message can be, as an example, "Click here, fill out your Visa® details, and receive a 10% Visa® statement credit if you complete this purchase in the next 2 hours!" A user clicks the link and a new window or a pop-up can then be launched. Alternatively it could be a wholly new window and not a true pop-up. This new window/pop-up could present the user with an opportunity to enroll in the advertised incentive program, such as by entering an account number for a payment account card of the user and the name of the user, e.g., in response to a prompt, such as, "Create Statement Credit Request—would you like to receive a 10% credit on your account for this purchase?" The purchase can them be made, e.g., using the card for which the information was previously entered in registering and the statement credit is received by the card account holder.

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least include a computing device. The computing device may include an inter-connect (e.g., bus and system core logic), which can interconnect such components of a computing device to a data processing device, such as a processor(s) or microprocessor(s), or other form of partly or completed programmable or pre-programmed logic circuitry, such as a controller or microcontroller, a digital signal processor, or any other form of device that can fetch instructions, operate on fetched instructions or pre-loaded/pre-programmed instructions, to carry out logic operations that, together, perform operations of processes and whole processes and functionalities as described in the present disclosure.

The data processing device may be formed by customized logic or by application specific integrated circuit ("ASIC") logic such as gate arrays or standard cells or the like, implementing customized logic on the base ASIC architecture. The interconnect may connect the data processing device to memory. The interconnect may be internal to the data processing device, such as coupling a microprocessor to on board cache memory or external memory such as main memory, or a disk drive. Commercially available microprocessors, one or more of which could be a computing device or part of a computing device, include a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The inter-connect in addition to interconnecting such as microprocessor(s) and memory may also interconnect such elements to a display controller and display device, and/or to peripheral devices such as input/output (I/O) devices, e.g., through an input/output controller(s). Typical I/O devices can include a mouse, a keyboard(s), a modem(s), network interfaces, printers, scanners, video cameras and other devices which are well known in the art. The inter-connect may include one or more buses connected to one another through various bridges, controllers and/or adapters. In one embodiment the I/O controller includes a Universal Serial Bus ("USB") adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile Random Access Memory ("RAM"), typically implemented as dynamic RAM ("DRAM") which requires power continually in order to refresh or maintain the data in the memory, and non-volatile Read Only Memory ("ROM"), and other types of non-volatile memory, such as a hard drive, flash memory, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and functions.

In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the disclosed subject matter.

In one embodiment, a user terminal can be a computing device, such as a in the form of a PDA, a cellular phone, a notebook computer, a personal desktop computer, etc. Alternatively, the traditional communication server communications client(s) may be used in some embodiments of the present invention.

While some embodiments of the disclosed subject matter have been described in the context of fully functioning computing devices and computing systems, those skilled in the art will appreciate that various embodiments of the disclosed subject matter are capable of being distributed, e.g., as a program product in a variety of forms and are capable of being applied regardless of the particular type of computing device machine or computer-readable media used to actually effect the distribution.

In various embodiments, hardwired circuitry, such as an ASIC(s), may be used in combination with software instructions to implement an aspect(s) of the disclosed subject matter. Thus, the techniques are not limited to any specific combination of hardware circuitry and software nor to any particular source for the instructions executed by any part of the computing device(s). Various functions and operations which have been described as being performed by or caused by software code to simplify description, will be understood by those skilled in the art to mean that the function(s) results from execution of the code by a processor, as a computing device or part of a computing device.

Although some of the drawings illustrate a number of operations in a particular order, operations which are not order dependent may be reordered and other operations may be combined or broken out. While some reordering or other groupings may have been specifically mentioned, others will be apparent to those of ordinary skill in the art and so the disclosed subject matter does not present an exhaustive list of alternatives.

It should also be recognized that the aspects of the disclosed subject matter may be implemented in parallel or seriatim in hardware, firmware, software or any combination(s) thereof co-located or remotely located at least in part from each other. The disclosed subject matter has been described with reference to one or more specific exemplary embodiments thereof.

It will be evident that various modifications may be made to the disclosed subject matter without departing from the broader spirit and scope of the disclosed subject matter as set forth in the appended claims. The specification and drawings are, accordingly, to be regarded in an illustrative sense for explanation of aspects of the disclosed subject matter rather than a restrictive or limiting sense.

The various operations or acts in a method or process may be performed in the order shown, or may be performed in another order. Additionally, one or more process or method operations may be omitted or one or more process or method operations may be added to the methods and processes. An additional operation, block, or action may be added in the beginning, end, or intervening existing elements of the methods and processes. Based on the disclosure and teachings provided herein, a person of ordinary skill in the art will appreciate other ways and/or methods for various implements. Moreover, it is understood that a functional operation of described methods or processes, and combinations thereof can be implemented by computer program instructions that, when executed by a processor, create means for implementing the functional operations. The instructions may be included in computer readable medium that can be loaded onto a general purpose computer, a special purpose computer, or other programmable apparatus.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. A method comprising:
   receiving, by a server associated with a transaction handler, an advertised incentive program configuration associated with an advertised incentive program;
   receiving, by the server associated with the transaction handler, a globally unique identifier for the advertised incentive program from the server providing a website of a merchant;
   determining, by the server associated with the transaction handler, the advertised incentive program configuration of the advertised incentive program based on the globally unique identifier;
   dynamically controlling, by the server associated with the transaction handler, content for an advertised incentive banner associated with a shopping cart of the website of the merchant for display to an account holder, wherein dynamically controlling the content for the advertised incentive banner associated with the shopping cart of the website of the merchant comprises:
- determining the content for the advertised incentive banner associated with the shopping cart of the website of the merchant for display to the account holder based on the advertised incentive program configuration;
- determining that the advertised incentive program is activated;
- sending, by the server associated with the transaction handler and to the server providing the website of the merchant, the content for the advertised incentive banner associated with the shopping cart of the website of the merchant for display to the account holder, based on the advertised incentive program being activated; and
- causing the website of the merchant to display the content for the advertised incentive banner associated with the shopping cart of the website of the merchant based on the advertised incentive program being activated;

registering the account holder for a statement credit associated with the advertised incentive program based on the account holder clicking on the advertised incentive banner associated with the shopping cart of the website of the merchant displayed on the website of the merchant;

creating a statement credit trigger based on registering the account holder for the statement credit associated with the advertised incentive program;

receiving, by the server associated with the transaction handler, an authorization request message comprising transaction information comprising an account number for an account, and product information for products purchased in a purchase transaction;

determining, by the server associated with the transaction handler using the statement credit trigger, that the purchase transaction is a qualifying transaction for the statement credit;

initiating, by the server associated with the transaction handler, the statement credit for an amount associated with the products purchased in the purchase transaction; and processing, by the server associated with the transaction handler, the purchase transaction based on the authorization request message.

2. The method of claim 1, wherein determining that the transaction is a qualifying transaction for the statement credit comprises:
- determining, that the products are being purchased within a particular time period as defined by the statement credit trigger.

3. The method of claim 1, wherein determining that the transaction is a qualifying transaction for a statement credit comprises:
- determining, that the products are being purchased within a list of products as defined by the statement credit trigger.

4. The method of claim 1, wherein the account number is received by a POS terminal of the merchant from an electronic payment device.

5. The method of claim 1, wherein initiating the statement credit for an amount associated with the products purchased in the purchase transaction, comprises:
- transmitting, by the computing apparatus, a modified authorization request message to an issuer computer, the modified authorization request message including an instruction to credit the account in the amount of the statement credit.

6. The method of claim 5, further comprising:
- Transmitting an additional message to the issuer computer, the additional message comprising an instruction to debit an account of a sponsor of the statement credit trigger.

7. The method of claim 1, wherein the statement credit trigger includes a specific merchant location at which the transaction is to occur.

8. The method of claim 1, wherein the authorization request message is received from a POS terminal of the merchant via in acquirer computer.

9. The method of claim 1, wherein initiating the statement credit for an amount associated with the products purchased in the purchase transaction, comprises:
- transmitting a modified authorization request message to an issuer computer, the modified authorization request message including an instruction to credit the account in the amount of the statement credit;
- receiving an authorization response message from the issuer computer; and
- forwarding the authorization response message to a POS terminal of the merchant.

\* \* \* \* \*